US009456198B2

(12) United States Patent
Hiramoto et al.

(10) Patent No.: US 9,456,198 B2
(45) Date of Patent: Sep. 27, 2016

(54) DEPTH ESTIMATING IMAGE CAPTURE DEVICE AND IMAGE SENSOR

(75) Inventors: Masao Hiramoto, Osaka (JP); Yasunori Ishii, Osaka (JP); Yusuke Monobe, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 584 days.

(21) Appl. No.: 13/813,503

(22) PCT Filed: Sep. 12, 2012

(86) PCT No.: PCT/JP2012/005779
§ 371 (c)(1),
(2), (4) Date: Jan. 31, 2013

(87) PCT Pub. No.: WO2013/054469
PCT Pub. Date: Apr. 18, 2013

(65) Prior Publication Data
US 2013/0188026 A1 Jul. 25, 2013

(30) Foreign Application Priority Data
Oct. 13, 2011 (JP) ................................. 2011-225968
Oct. 21, 2011 (JP) ................................. 2011-231711

(51) Int. Cl.
*H04N 13/02* (2006.01)
*G01B 11/24* (2006.01)
*G03B 35/10* (2006.01)

(52) U.S. Cl.
CPC ........... *H04N 13/0235* (2013.01); *G01B 11/24* (2013.01); *G03B 35/10* (2013.01); *H04N 13/0217* (2013.01); *H04N 13/0271* (2013.01)

(58) Field of Classification Search
CPC .. G01B 11/24; G03B 35/10; H04N 13/0217; H04N 13/0235; H04N 13/0271

USPC .......................................................... 348/49
See application file for complete search history.

(56) References Cited

U.S. PATENT DOCUMENTS

2002/0171740 A1 11/2002 Seo
2003/0072569 A1* 4/2003 Seo ..................... H04N 13/021
396/331

(Continued)

FOREIGN PATENT DOCUMENTS

JP 62-217790 A 9/1987
JP 62-291292 A 12/1987

(Continued)

OTHER PUBLICATIONS

International Search Report for corresponding International Application No. PCT/JP2012/005779 mailed Oct. 16, 2012.

(Continued)

*Primary Examiner* — Jorge L Ortiz Criado
*Assistant Examiner* — Yong Joon Kwon
(74) *Attorney, Agent, or Firm* — Renner, Otto, Boisselle & Sklar, LLP

(57) ABSTRACT

A depth estimating image capture device includes: an image sensor; an optical lens; a light-transmitting member arranged on the plane; and a signal processing section. The member includes a first mirror inside to reflect the light at least partially and a second mirror with the same reflection property as the first mirror on its upper surface. The first mirror has a reflective surface tilted with respect to the upper surface of the member. The second mirror has a reflective surface that is parallel to the upper surface. The first and second mirrors and are arranged so that a light beam coming from a point on a subject through the lens is reflected from the first mirror and from the second mirror and irradiates some area on an image capturing plane to make the irradiated area change according to the depth of the point on the subject.

24 Claims, 11 Drawing Sheets

(56) References Cited

U.S. PATENT DOCUMENTS

| | | | |
|---|---|---|---|
| 2006/0244583 A1* | 11/2006 | Kawada | 340/468 |
| 2008/0309813 A1 | 12/2008 | Watanabe | |
| 2009/0147096 A1* | 6/2009 | Yamaguchi et al. | 348/222.1 |
| 2009/0185159 A1* | 7/2009 | Rohner et al. | 356/5.01 |
| 2009/0284627 A1 | 11/2009 | Bando et al. | |
| 2010/0066812 A1 | 3/2010 | Kajihara et al. | |
| 2012/0162370 A1* | 6/2012 | Kim | G01B 11/02 348/46 |
| 2013/0242083 A1* | 9/2013 | Potts et al. | 348/125 |
| 2014/0267878 A1* | 9/2014 | Geelen et al. | 348/342 |

FOREIGN PATENT DOCUMENTS

| | | | | |
|---|---|---|---|---|
| JP | 11-098532 A | | 4/1999 | |
| JP | 2003-134533 A | | 5/2003 | |
| JP | 2005061899 | * | 3/2005 | H04N 5/255 |
| JP | 2008-167395 A | | 7/2008 | |
| JP | 2008-312080 A | | 12/2008 | |
| JP | 2009-017079 A | | 1/2009 | |
| JP | WO2010058545 | * | 5/2010 | H04N 9/07 |

OTHER PUBLICATIONS

Form PCT/ISA/237 corresponding International Application No. PCT/JP2012/005779 dated Oct. 16, 2012.

Ng et al., "Light Field Photography with a Hand-held Plenoptic Camera", Stanford Tech Report CTSR 2005-02 (cited in [0003] of the specification).

* cited by examiner

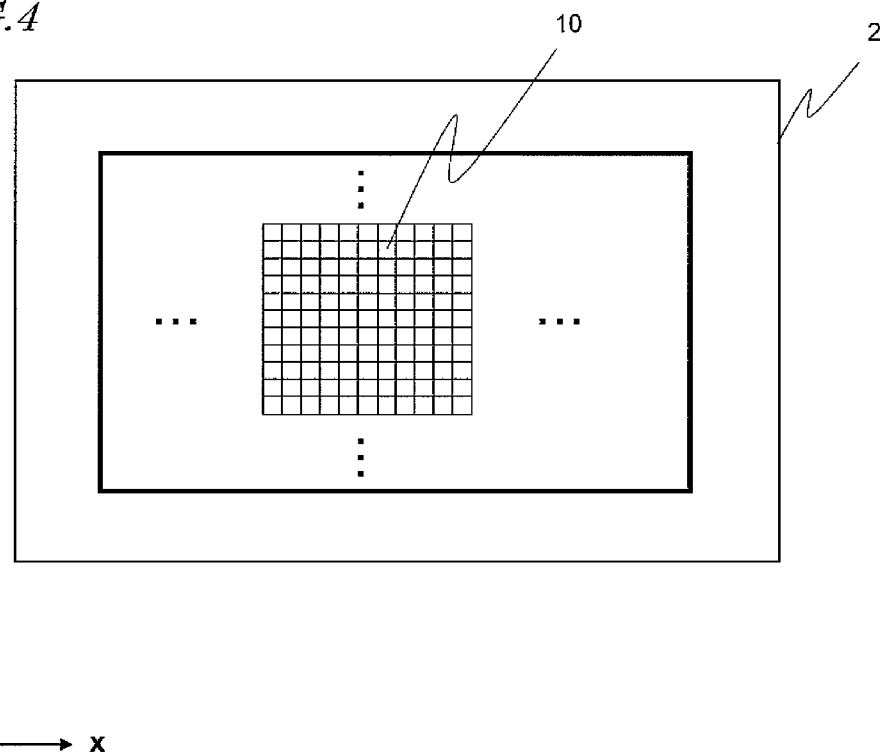
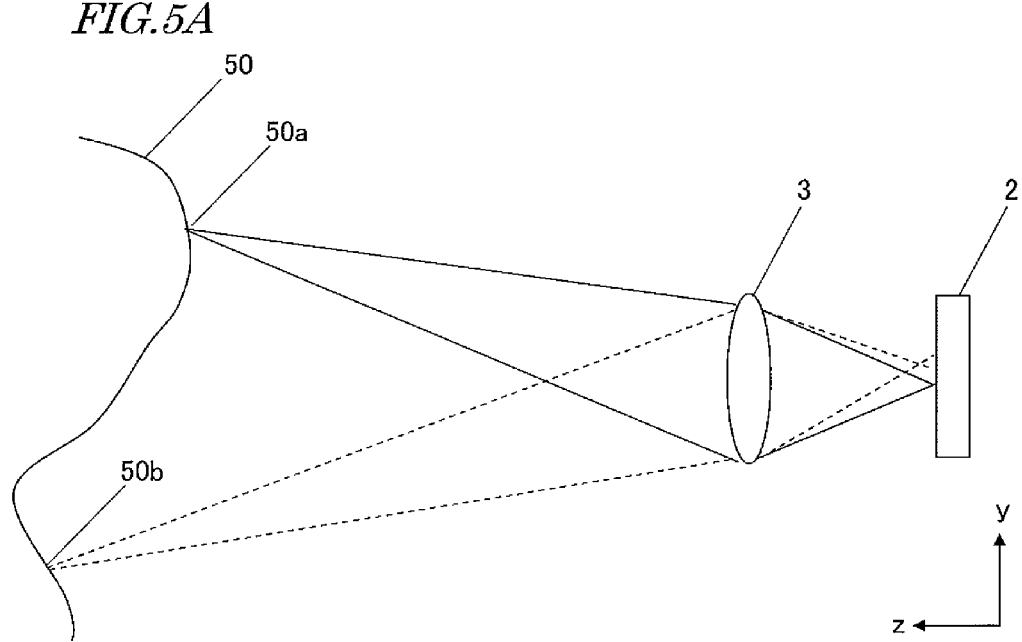

CROSS SECTION
VIEWED ON A-A'

CROSS SECTION VIEWED ON B-B'

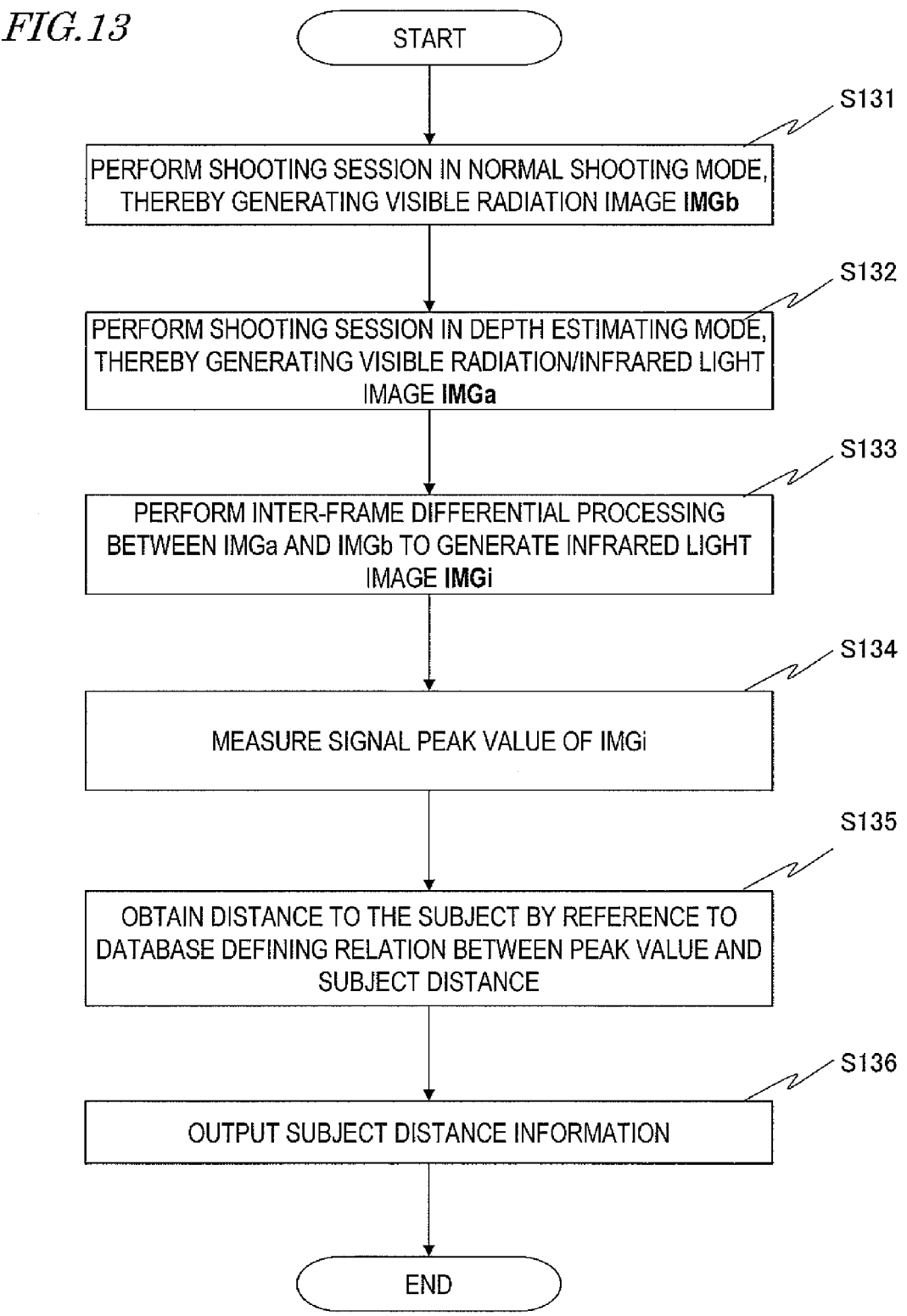

DEPTH ESTIMATING IMAGE CAPTURE DEVICE AND IMAGE SENSOR

TECHNICAL FIELD

The present application relates to a single-lens three-dimensional image capturing technology for getting the depth information of a subject using a single optical system and a single image sensor.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in an image sensor has been further reduced these days thanks to rapid development of semiconductor device processing technologies, thus getting an even greater number of pixels and drivers integrated together in an image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. Furthermore, image capture devices that can estimate the depth of a subject have just started to be developed.

As far as getting subject's depth information is concerned, there is a technique for getting depth information using a single-lens camera with multiple micro lenses and for changing the focus position of the image captured freely based on that information. Such a technique is called "light field photography" and a single-lens camera that uses such a technique is called a "light field camera". In a light field camera, a number of micro lenses are arranged on an image sensor. Each of those micro lenses is arranged so as to cover a plurality of pixels. By calculating information about the direction of incoming light based on the image information gotten through the image capturing session, the subject's depth can be estimated. Such a camera is disclosed in Non-Patent Document No. 1, for example.

The light field camera can calculate depth information. But its resolution is determined by the number of micro lenses and should be lower than the resolution determined by the number of pixels of the image sensor, which is a problem. Thus, to overcome such a problem, Patent Document No. 1 discloses a technique for increasing the resolution using two image capturing systems. According to such a technique, the incoming light is split into two divided incoming light beams, which are imaged by two image capturing systems, of which the groups of micro lenses are arranged so as to spatially shift from each other by a half pitch, and then the images captured in this manner are synthesized together, thereby increasing the resolution.

On the other hand, Patent Document No. 2 discloses a technique for changing the modes of operation from a normal shooting mode into the light field photography mode, or vice versa, using a single image capturing system. According to this technique, a micro lens, of which the focal length varies according to the voltage applied, is used. Specifically, the focal length of the micro lens is set to be the infinity in the former mode and set to be a predetermined distance in the latter mode. By adopting such a mechanism, an image with high resolution and depth information can be obtained.

CITATION LIST

Patent Literature

Patent Document No. 1: Japanese Laid-Open Patent Publication No. 11-98532
Patent Document No. 2: Japanese Laid-Open Patent Publication No. 2008-167395

Non-Patent Literature

Ren Ng, et al, "Light Field Photography with a Hand-held Plenoptic Camera", Stanford Tech Report CTSR 2005-02

SUMMARY OF INVENTION

Technical Problem

An embodiment of the present invention provides an image capturing technique for getting depth information using an image sensor that has a different configuration from a traditional one.

Solution to Problem

A depth estimating image capture device according to an aspect of the present invention includes: an image sensor having a plurality of photosensitive cells arranged on its image capturing plane; an optical lens that is arranged to condense light on the image capturing plane; a light-transmitting member that is arranged on the image capturing plane and that includes a first mirror inside to reflect the light at least partially and a second mirror with the same reflection property as the first mirror on its upper surface; and a signal processing section that processes photoelectrically converted signals supplied from the plurality of photosensitive cells. The first mirror has a reflective surface that is tilted with respect to the upper surface of the light-transmitting member. The second mirror has a reflective surface that is parallel to the upper surface. The first and second mirrors are arranged so that a light beam that has been come from a point on a subject through the optical lens is reflected from the first mirror, further reflected from the second mirror and irradiates some area on the image capturing plane to make the irradiated area change according to the depth of the point on the subject.

A depth estimating image capture device according to another aspect of the present invention includes: an image sensor having a plurality of photosensitive cells arranged on its image capturing plane; an optical lens that is arranged to condense light on the image capturing plane; a light-transmitting member that is arranged on the image capturing plane and that has a light beam splitting area configured to divide a light beam falling within a particular wavelength range and having come from a portion of a subject through the optical lens, into at least three light beams; and a signal processing section that processes photoelectrically converted signals supplied from the plurality of photosensitive cells. The light beam splitting area is made up of at least three partial areas including first, second and third partial areas, of which the respective upper surfaces are located on the same plane. A first mirror that reflects light falling within the particular wavelength range is arranged in the first partial area. A second mirror having the same reflection property as the first mirror is arranged in the second partial area. And a third mirror having the same reflection property as the first and second mirrors is arranged on the upper surface of each partial area. The first and second mirrors have a reflective surface that is tilted with respect to the upper surface of the light beam splitting area. The third mirror has a reflective surface that is parallel to the upper surface. The first, second and third mirrors are arranged so that the light beam falling within the particular wavelength range that has been incident on the first partial area from that portion of the subject through the optical lens is reflected at least partially from the first mirror, further reflected from the third mirror, and irradiates a first group of photosensitive cells included in the plurality of photosensitive cells, the light beam falling within the particular wavelength range that has been incident on the second partial area from that portion of the subject through the optical lens is reflected at least partially from the second mirror, further reflected from the third mirror, and irradiates a second group of photosensitive cells included in the plurality of photosensitive cells, and the light beam falling within the particular wavelength range that has been incident on the third partial area from that portion of the subject through the optical lens irradiates a third group of photosensitive cells included in the plurality of photosensitive cells, whereby distributions of the quantities of light received to be sensed by the first, second and third groups of photosensitive cells are different from each other and vary according to the depth of that portion of the subject.

This general and particular embodiment can be implemented as a system, a method, a computer program or a combination thereof.

Advantageous Effects of Invention

According to an embodiment of the present invention, information indicating the depth of a subject can be obtained using a different image sensor from a traditional one. Particularly, in an embodiment in which a mirror that reflects infrared light and transmits visible radiation and an infrared cut filter are combined, the depth information can be calculated based on the infrared light and an ordinary image without a decrease in resolution can be obtained based on the visible radiation. That is to say, both depth information and an ordinary image can be obtained at a time using a single-lens camera.

BRIEF DESCRIPTION OF DRAWINGS

FIG. 4 A plan view illustrating an image sensor according to the first exemplary embodiment.

FIG. 5A A schematic representation illustrating the principle of capturing an image according to the first exemplary embodiment.

FIG. 13 A flowchart showing how to perform an image capturing operation according to the second exemplary embodiment.

DESCRIPTION OF EMBODIMENTS

Figure 1:
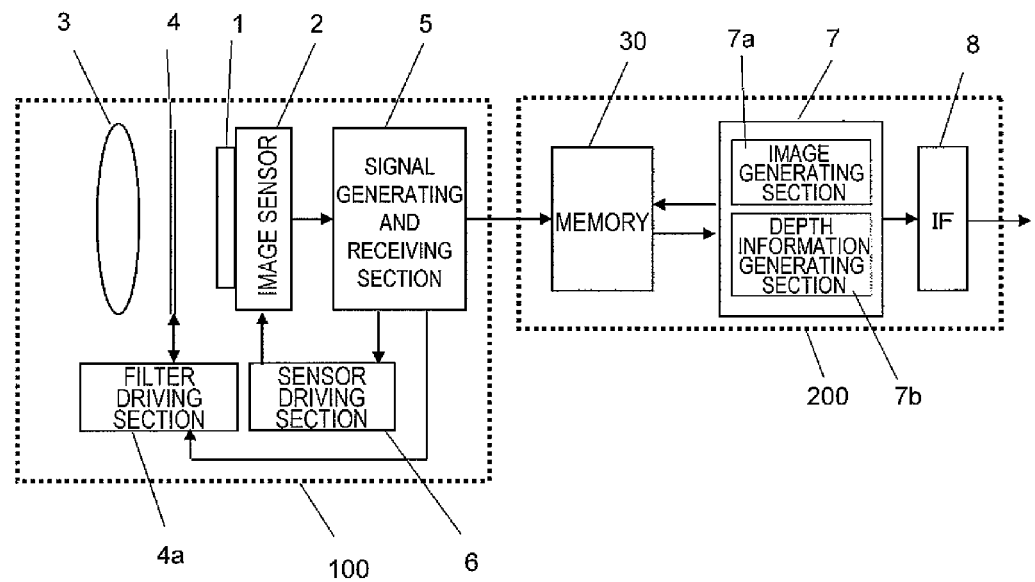
FIG. 1 A diagram illustrating a configuration for an image capture device as a first exemplary embodiment.

Exemplary embodiments of the present invention are outlined as follows:

A depth estimating image capture device according to an aspect of the present invention includes: an image sensor having a plurality of photosensitive cells arranged on its image capturing plane; an optical lens that is arranged to condense light on the image capturing plane; a light-transmitting member that is arranged on the image capturing plane and that includes a first mirror inside to reflect the light at least partially and a second mirror with the same reflection property as the first mirror on its upper surface; and a signal processing section that processes photoelectrically converted signals supplied from the plurality of photosensitive cells. The first mirror has a reflective surface that is tilted with respect to the upper surface of the light-transmitting member. The second mirror has a reflective surface that is parallel to the upper surface. The first and second mirrors are arranged so that a light beam that has been come from a point on a subject through the optical lens is reflected from the first mirror, further reflected from the second mirror and irradiates some area on the image capturing plane to make the irradiated area change according to the depth of the point on the subject.

In one embodiment, the signal processing section includes a depth information generating section that generates information indicating the depth of that point on the subject by sensing, based on the photoelectrically converted signals supplied from the plurality of photosensitive cells, what area is irradiated with the light beam.

In one embodiment, the depth information generating section generates the information indicating the depth by reference to pieces of information that have been collected in advance to define a correspondence between the size of the area irradiated with the light beam and the depth of that point on the subject.

In one embodiment, when projected onto a plane that is parallel to the upper surface of the light-transmitting member, the first mirror casts either a ringlike shadow or a circular shadow.

In one embodiment, when projected onto a plane that is parallel to the upper surface of the light-transmitting member, the second mirror casts a shadow that surrounds the first mirror's shadow.

In one embodiment, the light-transmitting member has a first group of mirrors that is comprised of a plurality of mirrors that include the first mirror and that have the same reflection property, the same shape and the same tilt angle with respect to the upper surface. Each mirror of the first group is arranged so that a light beam reflected from that mirror is further reflected from the second mirror and then irradiates one of multiple different areas on the image capturing plane.

In one embodiment, when projected onto the plane that is parallel to the upper surface of the light-transmitting member, the second mirror casts a shadow that surrounds each mirror of the first group.

In one embodiment, at least one of the first and second mirrors has a light transmitting property.

In one embodiment, the first and second mirrors have a property to reflect light falling within a particular wavelength range and transmit visible radiation falling out of the particular wavelength range.

In one embodiment, the depth estimating image capture device further includes: an optical filter that cuts light falling within the particular wavelength range; and a filter driving section that is able to introduce and remove the optical filter into/from an optical path leading from the subject to the image sensor.

In one embodiment, the depth estimating image capture device further includes a control section that controls the filter driving section and the image sensor so as to perform image capturing sessions twice in a row in a first state in which the optical filter is introduced into the optical path and in a second state in which the optical filter is removed from the optical path.

In one embodiment, the signal processing section includes: an image generating section that generates an image based on the photoelectrically converted signals supplied in the first state from the plurality of photosensitive cells; and a depth information generating section that generates information indicating the depth of that point on the subject by sensing, through processing including calculating the difference between the photoelectrically converted signals supplied in the first state from the plurality of photosensitive cells and the photoelectrically converted signals supplied in the second state from the plurality of photosensitive cells, what area on the image capturing plane is irradiated with the light falling within the particular wavelength range.

In one embodiment, the light falling within the particular wavelength range is infrared light.

In one embodiment, the lower limit of the particular wavelength range is longer than 650 nm.

An image sensor according to another aspect of the present invention includes: a photosensitive cell array in which a plurality of photosensitive cells are arranged two-dimensionally; and a light-transmitting member that is arranged to face the photosensitive cell array. The light-transmitting member includes a first mirror inside to reflect light at least partially and a second mirror with the same reflection property as the first mirror on its upper surface. The first mirror has a reflective surface that is tilted with respect to the upper surface of the light-transmitting member. The second mirror has a reflective surface that is parallel to the upper surface. And the first and second mirrors are arranged so that a light beam that has come from a point on a subject is reflected from the first mirror, further reflected from the second mirror and irradiates some area on the photosensitive cell array to make the irradiated area change according to the depth of the point on the subject.

A depth estimating image capture device according to another aspect of the present invention includes: an image sensor having a plurality of photosensitive cells arranged on its image capturing plane; an optical lens that is arranged to condense light on the image capturing plane; a light-transmitting member that is arranged on the image capturing plane and that has a light beam splitting area configured to divide a light beam falling within a particular wavelength range and having come from a portion of a subject through the optical lens, into at least three light beams; and a signal processing section that processes photoelectrically converted signals supplied from the plurality of photosensitive cells. The light beam splitting area is made up of at least three partial areas including first, second and third partial areas, of which the respective upper surfaces are located on the same plane. A first mirror that reflects light falling within the particular wavelength range is arranged in the first partial area. A second mirror having the same reflection property as the first mirror is arranged in the second partial area. A third mirror having the same reflection property as the first and second mirrors is arranged on the upper surface of each partial area. The first and second mirrors have a reflective surface that is tilted with respect to the upper surface of the light beam splitting area. The third mirror has a reflective surface that is parallel to the upper surface. The first, second and third mirrors are arranged so that the light beam falling within the particular wavelength range that has been incident on the first partial area from that portion of the subject through the optical lens is reflected at least partially from the first mirror, further reflected from the third mirror, and irradiates a first group of photosensitive cells included in the plurality of photosensitive cells, the light beam falling within the particular wavelength range that has been incident on the second partial area from that portion of the subject through the optical lens is reflected at least partially from the second mirror, further reflected from the third mirror, and irradiates a second group of photosensitive cells included in the plurality of photosensitive cells, and the light beam falling within the particular wavelength range that has been incident on the third partial area from that portion of the subject through the optical lens irradiates a third group of photosensitive cells included in the plurality of photosensitive cells, whereby distributions of the quantities of light received to be sensed by the first, second and third groups of photosensitive cells are different from each other and vary according to the depth of that portion of the subject.

In embodiment, the signal processing section includes a depth information generating section that generates information indicating the depth of that portion of the subject based on the photoelectrically converted signals supplied from the first through third groups of photosensitive cells.

In one embodiment, the depth information generating section generates the information indicating the depth by reference to pieces of information that have been collected in advance to define a correspondence between either respective peak values or distributions of the quantities of light received to be sensed by the first through third groups of photosensitive cells and the depth of that portion of the subject.

In one embodiment, the light beam splitting area is made up of first, second, third and fourth partial areas, of which the shapes and sizes are equal to each other, and the third mirror is arranged in the same pattern on the upper surface of the third and fourth partial areas.

In one embodiment, when viewed perpendicularly to the upper surface of the light beam splitting area, the first through fourth partial areas are arranged in two rows and two columns.

In one embodiment, the first partial area is located at a row 1, column 2 position, the second partial area is located at a row 2, column 1 position, the third partial area is located at a row 1, column 1 position, and the fourth partial area is located at a row 2, column 2 position.

In one embodiment, the third mirror has a circular or ringlike opening on the upper surface of each partial area.

In one embodiment, the third mirror has a first ringlike opening on the upper surface of the first partial area, a second ringlike opening that is different in size from the first opening on the upper surface of the second partial area, and a circular opening on the upper surface of the third partial area.

In one embodiment, the first mirror is arranged to reflect the light beam that has come through the first opening toward a portion of the third mirror that is surrounded with the first opening, and the second mirror is arranged to reflect the light beam that has come through the second opening toward a portion of the third mirror that is surrounded with the second opening.

In one embodiment, the particular wavelength range is the wavelength range of infrared light.

In one embodiment, the lower limit of the particular wavelength range is longer than 650 nm.

In one embodiment, the first through third mirrors have a property to transmit visible radiation falling out of the particular wavelength range.

In one embodiment, the light-transmitting member has a plurality of light beam splitting areas which include the light beam splitting area and which each have the same structure.

In one embodiment, the depth estimating image capture device further includes: an optical filter that cuts light falling within the particular wavelength range; and a filter driving section that is able to introduce and remove the optical filter into/from an optical path.

In one embodiment, the depth estimating image capture device further includes a control section that controls the filter driving section and the image sensor so as to perform image capturing sessions twice in a row in a first state in which the optical filter is introduced into the optical path and in a second state in which the optical filter is removed from the optical path.

In one embodiment, the signal processing section includes: an image generating section that generates an image based on the photoelectrically converted signals supplied in the first state from the plurality of photosensitive cells; and a depth information generating section that generates information indicating the depth of that portion of the subject through processing including calculating the difference between the photoelectrically converted signals supplied in the first state from the plurality of photosensitive cells and the photoelectrically converted signals supplied in the second state from the plurality of photosensitive cells.

An image sensor according to another aspect of the present invention includes: a photosensitive cell array in which a plurality of photosensitive cells are arranged two-dimensionally; and a light-transmitting member that is arranged to face the photosensitive cell array and that has a light beam splitting area configured to divide a light beam falling within a particular wavelength range and having come from a portion of a subject, into at least three light beams. The light beam splitting area is made up of at least three partial areas including first, second and third partial areas, of which the respective upper surfaces are located on the same plane. A first mirror that reflects the light falling within the particular wavelength range is arranged in the first partial area. A second mirror having the same reflection property as the first mirror is arranged in the second partial area. A third mirror having the same reflection property as the first and second mirrors is arranged on the upper surface of each said partial area. The first and second mirrors have a reflective surface that is tilted with respect to the upper surface of the light beam splitting area. The third mirror has a reflective surface that is parallel to the upper surface. The first, second and third mirrors are arranged so that the light beam falling within the particular wavelength range that has been incident on the first partial area from that portion of the subject is reflected at least partially from the first mirror, further reflected from the third mirror, and irradiates a first group of photosensitive cells included in the plurality of photosensitive cells, the light beam falling within the particular wavelength range that has been incident on the second partial area from that portion of the subject is reflected at least partially from the second mirror, further reflected from the third mirror, and irradiates a second group of photosensitive cells included in the plurality of photosensitive cells, and the light beam falling within the particular wavelength range that has been incident on the third partial area from that portion of the subject irradiates a third group of photosensitive cells included in the plurality of photosensitive cells, whereby distributions of the quantities of light received to be sensed by the first, second and third groups of photosensitive cells are different from each other and vary according to the depth of that portion of the subject.

Hereinafter, more specific embodiments of the present invention will be described with reference to the accompanying drawings. In the following description, any pair of components having the same or similar function will be identified by the same reference numeral.

Embodiment 1

First of all, a depth estimating image capture device (which will be simply referred to herein as an "image capture device") as a first embodiment will be described. Before this embodiment is described in detail, however, the basic idea of this embodiment will be described briefly.

An image capture device according to this embodiment includes: an image sensor having a plurality of photosensitive cells arranged on its image capturing plane; an optical lens that is arranged to condense light on the image capturing plane of the image sensor; a light-transmitting member that is arranged on the image capturing plane; and a signal processing section that processes the output signals of the plurality of photosensitive cells. The light-transmitting member includes first and second mirrors that are arranged inside and on its upper surface, respectively. In this description, the "upper surface" refers herein to one of the surfaces of the light-transmitting member that is opposite to another surface thereof with the image sensor. The first and second mirrors are designed so as to reflect incoming light partially. These mirrors typically have a property to reflect light falling within a particular wavelength range and transmit light falling within any other wavelength range. However, each of these mirrors may also be a mirror that splits light irrespective of the wavelength range such as a half mirror. The first mirror is arranged inside of the light-transmitting member and its reflective surface tilts with respect to the upper surface of the light-transmitting member. The second mirror is arranged on the light-transmitting member so that its reflective surface becomes parallel to the upper surface of the light-transmitting member.

Suppose light that has come from a point on a subject has entered an image capture device with such a configuration. In that case, part of the incoming light transmitted through the optical lens is reflected from the first mirror first, further reflected from the second mirror, and then irradiates some area of the image capturing plane of the image sensor. In this case, the irradiated area depends on the depth of that point of the subject, i.e., the distance from the image capture device. This is because if the depth is different, the light will be incident on the light-transmitting member at a different angle of incidence, and therefore, the light reflected from the first and second mirrors will travel in a different direction.

According to this embodiment, from the light that has been incident on the image capturing plane of the image sensor and is going to be photoelectrically converted, its components that have come after having been reflected from the first and second mirrors are extracted, thereby detecting the shape and size of the area irradiated with the light having those components. And by analyzing the results of detection, information indicating the subject's depth can be obtained. Specific processing for generating such depth information will be described later.

In this embodiment, the image capture device itself includes an image processing section and generates information indicating the subject's depth (which will be referred to herein as "depth information") by itself. However, even if the image capture device does not generate the depth information by itself but if a photoelectrically converted signal obtained by capturing an image (which will be sometimes referred to herein as a "pixel signal") is sent to another device, that another device may generate the depth information instead. In this description, such an image capture device that does not generate the depth information by itself but that provides necessary information to generate the depth information will also be referred to herein as a "depth estimating image capture device".

Hereinafter, a more specific configuration and operation of this embodiment will be described.

FIG. 1 is a block diagram illustrating an overall configuration for an image capture device according to this embodiment. The image capture device of this embodiment is a digital electronic camera and includes an image capturing section 100 and a signal processing section 200 that generates a signal representing an image (i.e., an image signal) based on the signal generated by the image capturing section 100. The image capture device may have the function of generating a moving picture not just a still picture.

The image capturing section 100 includes a solid-state image sensor 2 (which will be simply referred to herein as an "image sensor") with a photosensitive cell array in which a number of photosensitive cells are arranged on its image capturing plane, a light-transmitting plate 1 on which a mirror that reflects infrared light (which will be referred to herein as an "infrared reflecting mirror") is arranged, an optical lens 3 which produces an image on the image capturing plane of the image sensor 2, an infrared cut filter 4 and a filter driving section 4a which introduces and removes the infrared cut filter 4 into/from between the optical lens 3 and the light-transmitting plate 1. The light-transmitting plate 1 is arranged on the image capturing plane of the image sensor 2. In this embodiment, the light-transmitting plate 1 functions as the light-transmitting member described above. The image capturing section 100 further includes a signal generating and receiving section 5, which not only generates a fundamental signal to drive the image sensor 2 but also receives the output signal of the image sensor 2 and sends it to the signal processing section 200, and a sensor driving section 6 which drives the image sensor 2 in accordance with the fundamental signal generated by the signal generating and receiving section 5. The image sensor 2 is typically a CCD or CMOS sensor, which may be fabricated by known semiconductor device processing technologies. The signal generating and receiving section 5 and the sensor driving section 6 may be implemented as an LSI such as a COD driver. It should be noted that the filter driving section 4a does not have to introduce the infrared cut filter 4 to between the optical lens 3 and the light-transmitting plate 1. Alternatively, the filter driving section 4a just needs to be configured to drive the infrared cut filter 4 and introduce or remove the filter 4 into/from any arbitrary position on the optical path leading from the subject to the image sensor 2.

The signal processing section 200 includes an image processing section 7 which processes the output signal of the image capturing section 100 to generate an ordinary image without a decrease in resolution and subject's depth information, a memory 30 which stores various kinds of data for use to generate the image signal, and an interface (I/F) section 8 which sends out the image signal and depth information thus generated to an external device. The image processing section 7 includes an image generating section 7a which generates the ordinary image and a depth information generating section 7b which generates the depth information. The image processing section 7 may be a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image processing section 7 or compressed image data. These image data are then output to either a storage medium or a display section (neither is shown) by way of the interface section 8.

The image capture device of this embodiment actually further includes an electronic shutter, a viewfinder, a power supply (or battery), a flashlight and other known components. However, description thereof will be omitted herein because none of them are essential components that would make it difficult to understand how the present invention works unless they were described in detail. Also, this configuration is only an example. Thus, in this embodiment, additional components other than the light-transmitting plate 1, the image sensor 2 and the image processing section 7 may be implemented as an appropriate combination of known elements.

Hereinafter, the configuration of the image capturing section 100 will be described in further detail. When the location or direction of an image capturing area is mentioned in the following description, the xyz coordinates shown on the drawings will be used. Specifically, the "xy plane" is supposed to represent the image capturing plane of the image sensor 10, the "x-axis" and "y-axis" are supposed to respectively represent the horizontal and vertical directions on the image capturing plane, and the "z-axis" is supposed to represent the direction that intersects with the image capturing plane at right angles. It should be noted that the "horizontal direction" and "vertical direction" mean two directions on the image capturing plane that correspond to the width and length directions of the image to be generated.

Figure 2:
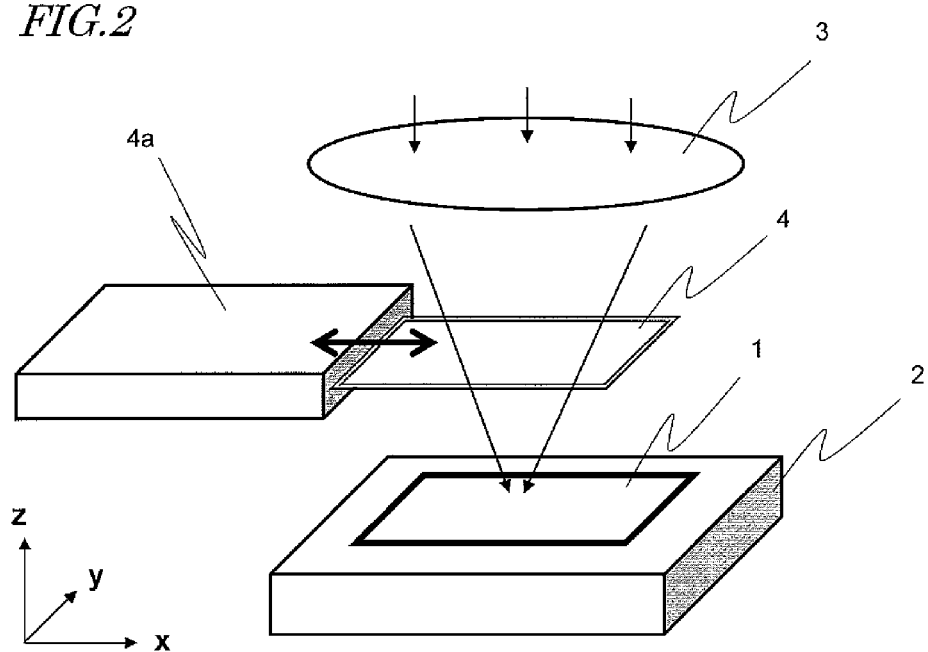
FIG. 2 A schematic representation illustrating an image capturing section according to the first exemplary embodiment.

FIG. 2 schematically illustrates the relative arrangement of the lens 3, the infrared cut filter 4, the light-transmitting plate 1 and the image sensor 2 in the image capturing section 100. When an image is going to be captured, the infrared cut filter 4 is shifted in the x direction by the filter driving section 4a. If the infrared cut filter 4 enters the area over the light-transmitting plate 1, infrared ray components are filtered out of the light that is going to be incident on the image sensor 2. On the other hand, if the infrared cut filter 4 is out of the area over the light-transmitting plate 1 of the optical system, then the infrared ray components included in the incoming light are not filtered out but are incident as they are on the image capturing plane of the image sensor 2. The image capture device of this embodiment generates an ordinary image based on a pixel signal that has been obtained with the infrared cut filter 4 introduced into the area over the light-transmitting plate 1. This mode of operation will be referred to herein as a "normal shooting mode". On the other hand, the image capture device calculates the subject's depth based on a pixel signal that has been obtained with the infrared cut filter removed from the area over the light-transmitting plat 1. This mode of operation will be referred to herein as a "depth estimating mode".

Even though the lens 3 may be a lens unit consisting of a group of lenses, the lens 3 is illustrated in FIG. 2 as a single lens for the sake of simplicity. The lens 3 is a known lens and condenses the incoming light and images the light on the image capturing plane of the image sensor 2, no matter whether the infrared cut filter 4 is introduced or not. It should be noted that the relative arrangement of the respective members shown in FIG. 2 is only an example and does not always have to be adopted according to the present invention. For example, the positions of the lens 3, the infrared cut filter 4 and the filter driving section 4a may be exchanged with each other. In addition, although the infrared cut filter 4 is supposed to be introduced and removed in the x direction according to this embodiment, the direction may also be any other one as long as the infrared ray components of the incoming light can be filtered out. That is to say, the infrared cut filter 4 may also be moved in the y direction or even in a different direction from the x or y direction.

Figure 3A:
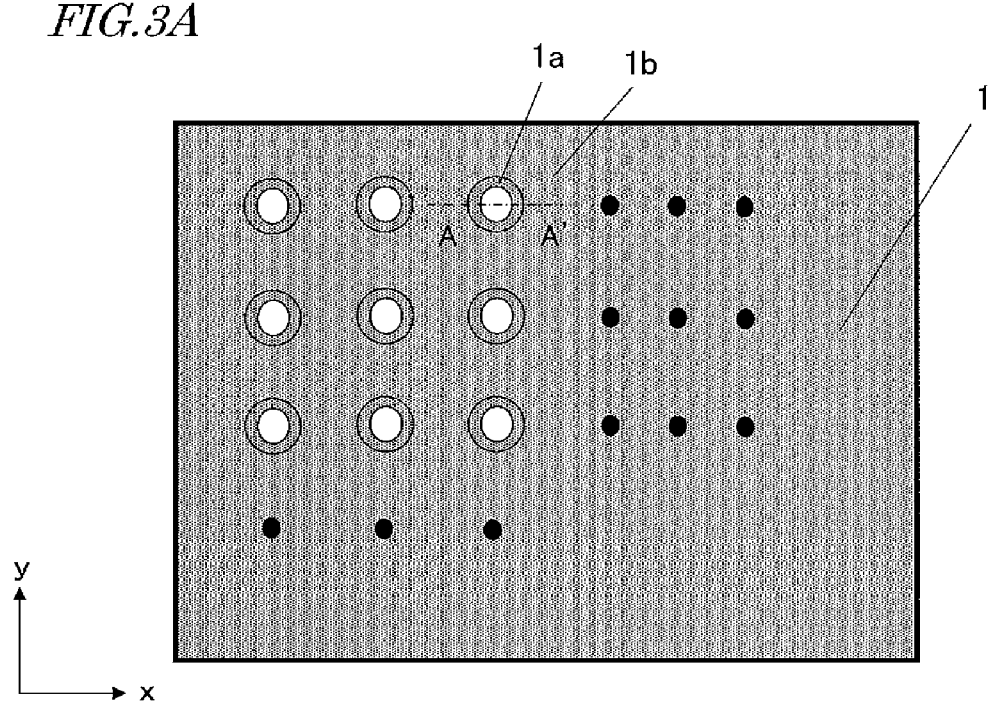
FIG. 3A A plan view illustrating a light-transmitting plate according to the first exemplary embodiment.

FIG. 3A is a plan view illustrating the light-transmitting plate 1. The surface of the light-transmitting plate 1 is mostly covered with the infrared reflecting mirror 1b but has some circular portions which are not covered with the infrared reflecting mirror 1b (and which will be referred herein as "infrared reflector's openings"). In this embodiment, the light-transmitting plate 1 is made of a transparent glass material and is attached onto the photosensing section of the image sensor 2. However, the light-transmitting plate 1 does not have to be made of glass but may also be made of any other material as long as the light-transmitting plate 1 can transmit light.

Figure 3B:
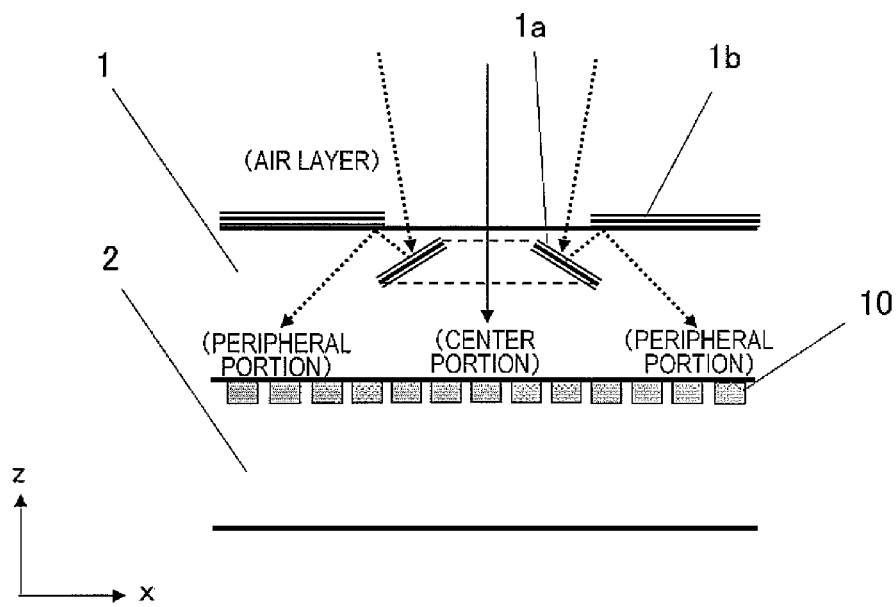
FIG. 3B A cross-sectional view of the light-transmitting plate according to the first exemplary embodiment as viewed on the plane A-A'.

FIG. 3B is a cross-sectional view as viewed on the plane A-A' shown in FIG. 3A. The light-transmitting plate 1 includes a ringlike infrared reflecting mirror 1a, which is arranged inside of the plate 1 and of which the reflective surface is tilted. This infrared reflecting mirror 1a has a ring shape and therefore has no infrared ray reflecting portion at the center. Thus, light transmitted through the center portion will be incident as it is on a photosensitive cell 10 of the image sensor 2. In this embodiment, the infrared reflecting mirrors 1a and 1b function as the first and second mirrors, respectively.

Each of these infrared reflecting mirrors 1a and 1b has a property to reflect mainly infrared light and transmit visible radiation falling within any other wavelength range. In this description, the "infrared light" refers herein to an electromagnetic wave, of which the wavelength is longer than 650 nm, for example. By using such infrared reflecting mirrors 1a and 1b, visible radiation, which is perceptible for a human being, can be incident on the image sensor 2 without being reflected.

The light-transmitting plate 1 including the infrared reflecting mirrors 1a and 1b shown in FIG. 3B may be made by depositing and patterning a thin film by known lithography and etching techniques. For example, first of all, a number of conical projections are formed on a transparent substrate. Next, a multilayer dielectric film, including multiple layers that have had their refractive index and thickness designed so as to reflect only infrared light and transmit any other visible radiation, is deposited. Then, unnecessary portions of the multilayer film deposited are etched away, thereby forming an infrared reflecting mirror 1a. Subsequently, a transparent layer is further deposited thereon and shaped so as to have a flat upper surface. Finally, a multilayer dielectric film having the same reflection and transmission property as the infrared reflecting mirror 1a is deposited over the entire surface except the region over the infrared reflecting mirror 1a, thereby forming an infrared reflecting mirror 1b. In this manner, the light-transmitting plate 1 can be made. The light-transmitting plate 1 thus obtained may be bonded onto the image capturing plane of the image sensor 2 and combined with the image sensor 2. That is why an image sensor including the light-transmitting plate 1 of this embodiment could be manufactured and retailed independently.

FIG. 4 illustrates a part of a photosensitive cell array consisting of a number of photosensitive cells 10 which are arranged in columns and rows on the image capturing section of the image sensor 2. Each of those photosensitive cells 10 typically has a photodiode and performs photoelectric conversion, thereby outputting a photoelectrically converted signal representing the quantity of the light received.

With such a configuration adopted, in the normal shooting mode, the light incident on this image capture device during an exposure process is transmitted through the lens 3, the infrared cut filter 4 and the light-transmitting plate 1, imaged on the image capturing plane of the image sensor 2, and then photoelectrically converted by the respective photosensitive cells 10. In this mode, the infrared ray components are filtered out by the infrared cut filter 4, and therefore, the incident light is photoelectrically converted without being affected by the infrared reflecting mirrors 1a and 1b which are arranged either on the surface or inside of the light-transmitting plate 1.

In the depth estimating mode, on the other hand, the light incident on this image capture device during the exposure process is transmitted through the lens 3 and light-transmitting plate 1, imaged on the image capturing plane of the image sensor 2, and then photoelectrically converted by the respective photosensitive cells 10. In this mode, since the incoming light is not passed through the infrared cut filter 4, the incoming light is affected by the infrared reflecting mirrors 1a and 1b which are arranged on the surface or inside of the light-transmitting plate 1 as will be described later.

The photoelectrically converted signals generated by the respective photosensitive cells 10 are sent to the signal processing section 200 by way of the signal generating and receiving section 5. In the signal processing section 200, the image processing section 7 generates an image based on the signals supplied in the normal shooting mode. As a result, an ordinary image can be obtained without decreasing its resolution. In the depth estimating mode, on the other hand, the image processing section 7 calculates the depth information by performing the following processing. It should be noted that the ordinary image is generated by the image generating section 7a in the image processing section 7 and the depth information is generated by the depth information generating section 7b in the image processing section 7.

Hereinafter, the depth estimating mode will be described in detail. It should be noted that before entering this mode, the image capture device needs to capture one image in the normal shooting mode. In the depth estimating mode, the incoming light is directly incident on the light-transmitting plate 1 through the lens 3 but most of the infrared ray components of the incoming light are reflected by the infrared reflecting mirror 1b. Meanwhile, the infrared ray components that have entered through the infrared reflector's openings are either directly incident on the photosensitive cells 10 or reflected from the infrared reflecting mirror 1a, further reflected from the infrared reflecting mirror 1b and then incident on the photosensitive cells 10. In this embodiment, one infrared reflector's opening is provided for approximately every 20 pixels both in the x and y directions. In this description, "one pixel" refers herein to an area in which one photosensitive cell is arranged. Also, the thickness of the light-transmitting plate 1 and the shape and position of the infrared reflecting mirror 1a are designed so that the infrared light reflected from the infrared reflecting mirrors 1a and 1b fall within that range of 20 pixels. As the infrared reflector's opening has such an optical structure, there are a lot of infrared ray components not only right under the center of that opening but also around that opening due to reflection of the infrared ray from the infrared reflecting mirrors 1a and 1b. According to this embodiment, by measuring the radius of a ringlike image produced by the infrared ray components in the surrounding region with the region right under the infrared reflector's opening defined to be the center, the distance from this image capture device to the subject can be estimated.

Figure 5B:
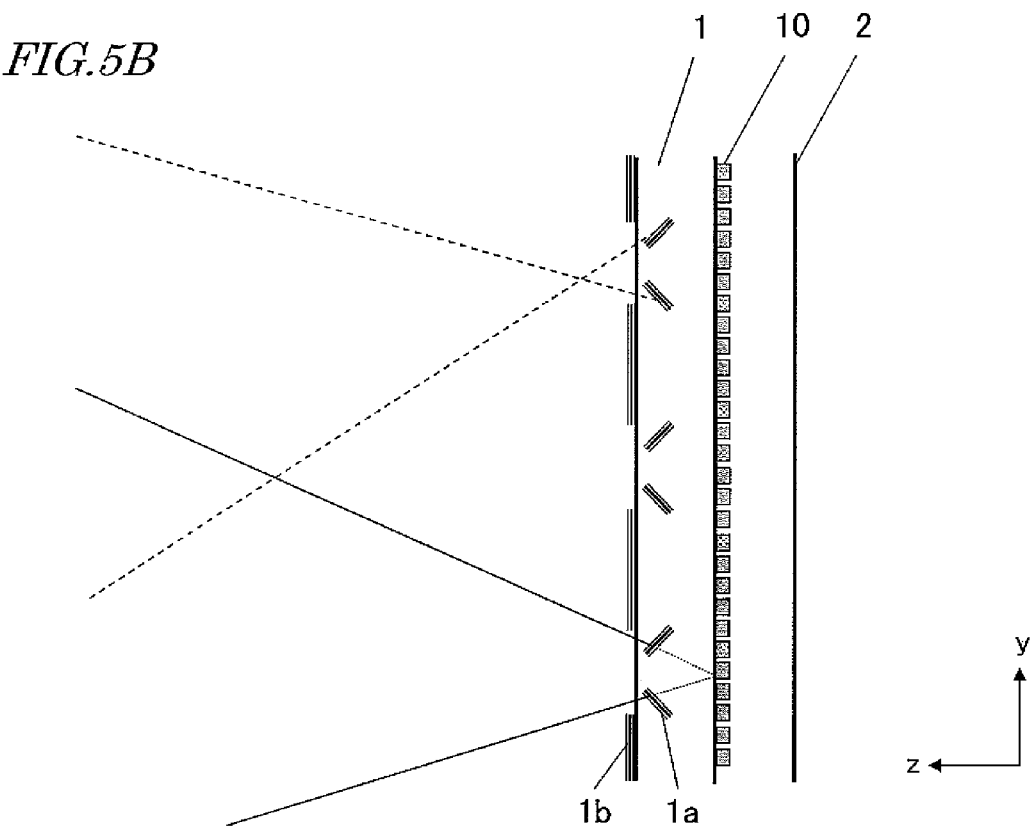
FIG. 5B A partial enlarged view of FIG. 5A.

Next, the principle of estimating the distance according to this embodiment will be described with reference to FIGS. 5A through 5C. FIG. 5A illustrates conceptually and schematically how a light ray that has come from a point 50a on a subject 50 (as indicated by the solid lines) and a light ray that has come from another point 50b, which is located more distant from the image capture device than the point 50a is (as indicated by the dotted lines) are converged by the optical lens 3 and incident on the image sensor 2. In FIG. 5A, illustration of every component of the image capture device but the optical lens 3 and the image sensor 2 is omitted. FIG. 5B is a partial enlarged view illustrating the image capturing plane and its surrounding region of the image sensor 2 shown in FIG. 5A on a larger scale. In this example, the light ray that has come from the point 50a (as indicated by the solid lines) is focused on the image capturing plane on which the photosensitive cells 10 are arranged. On the other hand, the light ray that has come from the point 50b (as indicated by the dotted lines) is focused at a position that is closer to the subject than the photosensitive cells 10 or the light-transmitting plate 1 is. Thus, it can be seen that the infrared light is reflected mutually differently from the infrared reflecting mirrors 1a and 1b. In this manner, the degree of convergence of the light that is going to be incident on the light-transmitting plate 1 and reflection of the light from the infrared reflecting mirrors 1a and 1b vary according to the depth of the subject.

Figure 5C:
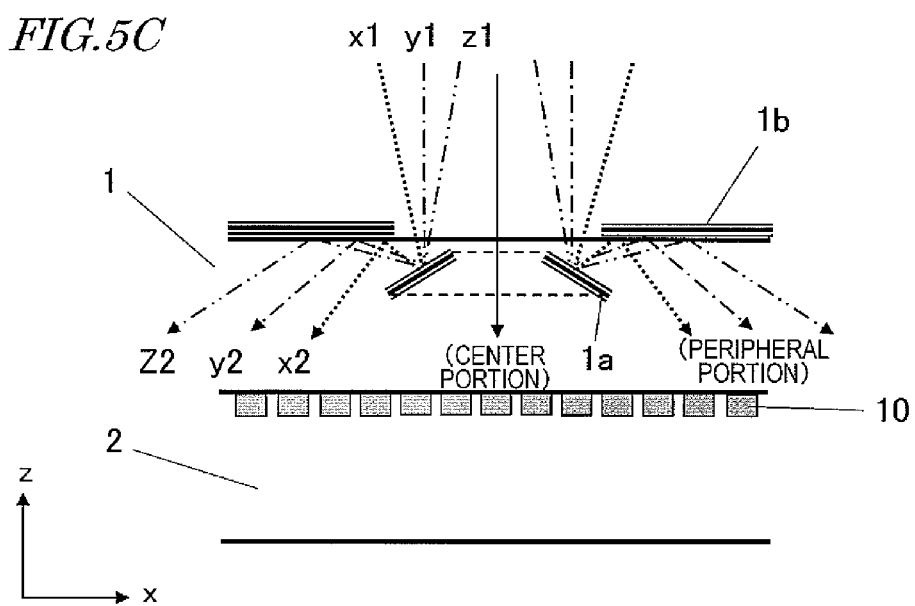
FIG. 5C A view illustrating conceptually how light is incident on a light-transmitting plate according to the first exemplary embodiment.

FIG. 5C illustrates conceptually and more specifically how the degree of convergence of the light that has come from a point on the subject and is going to be incident on the light-transmitting plate 1 and the pattern of reflection from the infrared reflecting mirrors 1a and 1b vary according to the depth of that point on the subject. In FIG. 5C, the dotted lines indicate the path of the light ray in a situation where the incoming light is so converged by the lens 3 that the center of imaging is located closer to the image sensor 2 than the surface of the light-transmitting plate 1 is. In that case, the light ray travels in the order of x1 and x2. On the other hand, in FIG. 5C, the one-dot chains indicate the path of the light ray in a situation where the center of imaging of the incoming light is located right on the light-transmitting plate 1 and the incoming light can be regarded as being incident substantially perpendicularly to the upper surface of the light-transmitting plate 1. In that case, the light ray travels in the order of y1 and y2. Furthermore, in FIG. 5C, the two-dot chains indicate the path of the light ray in a situation where the center of imaging of the incoming light is located closer to the subject than the light-transmitting plate 1 is. In that case, the light ray travels in the order of z1 and z2. These light rays will form ringlike irradiated regions on the image capturing plane of the image sensor 2 and such ringlike images are obtained. The images formed by these three kinds of light rays with mutually different degrees of convergence come to have mutually different shapes.

As can be seen from these results, the ringlike images produced by the infrared reflecting mirrors 1a and 1b have their radius changed depending on how the incoming light is imaged. In this case, if the correspondence between the distance from the image capture device to the subject, the status of imaging, and the radii of the ringlike images is checked out in advance via experiments or simulations, then the subject's depth can be obtained by reference to that correspondence. And information defining such correspondence may be stored in advance on a storage medium such as the memory 30. The depth information generating section 7b detects a ringlike image from the image captured and measures its radius, thereby calculating the distance from the image capture device to the subject based on that radius measured and the information defining the correspondence.

Next, it will be described how this image capture device operates in the depth estimating mode. In the following description, the subject is supposed to stand still. First of all, the image capture device captures an image and saves it in the memory 30. Such an image will be identified herein by IMGa. It should be noted that another image IMGb that had been captured in the normal shooting mode just before the image capture device entered this mode should also be saved in the memory 30. Next, the image processing section 7 performs inter-frame differential processing on these images IMGa and IMGb. In this case, in capturing an image in this depth estimating mode, the image sensor 2 receives visible radiation and infrared light in a region that faces the infrared reflector's opening and in its surrounding region but receives only visible radiation everywhere else. In the normal shooting mode, on the other hand, the image sensor 2 receives only visible radiation in the entire photosensing area. That is why by performing the inter-frame differential processing, an image IMGi produced by the infrared light that has entered through the infrared reflector's opening can be detected. The image IMGi has high lightness right under the center of the infrared reflector's opening and forms a ringlike pattern around the center of the infrared reflector's opening. The depth information generating section 7b of the image processing section 7 detects that ringlike image, measures its radius, and calculates the distance to the subject by reference to a database that has been compiled in advance to define the relation between the radius of the ringlike image and the distance from the image capture device to the subject. Furthermore, the depth information generating section 7b of the image processing section 7 outputs not only the image IMGb but also a position on the image IMGb corresponding to the position of each infrared reflector's opening and the depth information calculated to an external device via an interface section 8. According to this embodiment, since the ringlike image is obtained from each infrared reflector's opening, the depth of each point on the subject can be obtained based on the radius of each ringlike image. Optionally, the depth information generating section 7b may obtain the distribution of the depths of respective points on the subject and may generate and output a depth image representing that distribution.

Figure 6:
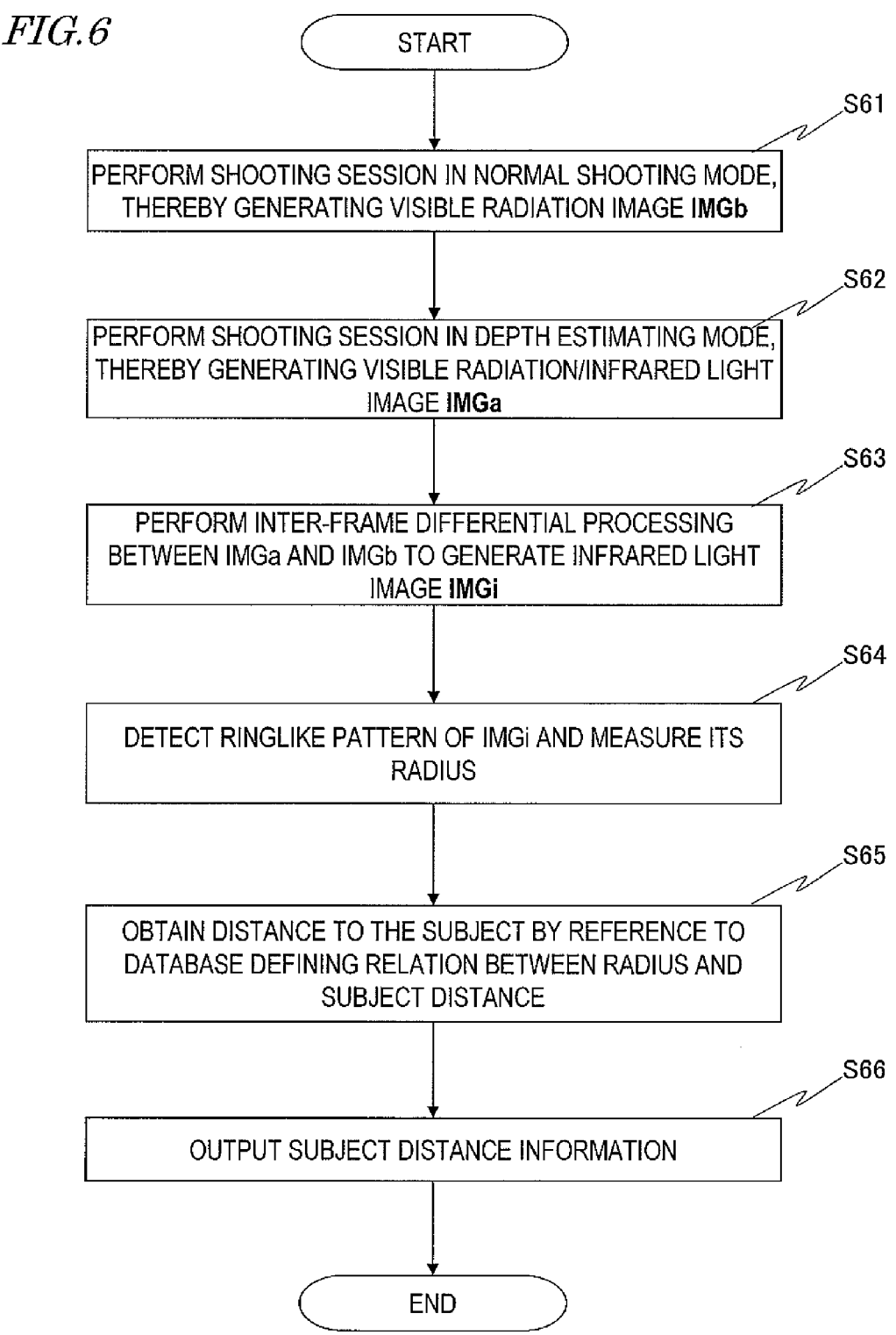
FIG. 6 A flowchart showing how to perform an image capturing operation according to the first exemplary embodiment.

This series of operations can be summarized by the flowchart shown in FIG. 6. First of all, the image capture device performs a shooting session in the normal shooting mode, thereby generating a visible radiation image IMGb (in Step S61). Next, the image capture device performs a shooting session in the depth estimating mode, thereby generating a visible radiation/infrared light image IMGa (in Step S62). Thereafter, the depth information generating section 7b performs inter-frame difference calculating processing between IMGa and IMGb to generate an infrared light image IMGi (in Step S63). Then, the depth information generating section 7b detects the ringlike pattern of IMGi and measures the radius each ringlike pattern (in Step S64). Subsequently, by reference to the database that has been compiled in advance to define the relation between the radius and the subject distance with the radius measured, the depth information generating section 7b obtains the distance to the subject (in Step S65). Finally, the depth information generating section 7b outputs information representing the subject distance (in Step S66).

As described above, according to this embodiment, two image capturing sessions are carried out in a row in a first state in which the infrared cut filter 4 is introduced into the optical path (i.e., in the normal shooting mode) and in a second state in which the infrared cut filter 4 is removed from the optical path. These two consecutive image capturing sessions can be carried out by making the signal generating and receiving section 5 shown in FIG. 1 control the operations of the filter driving section 4a and the sensor driving section 6. The image capture device of this embodiment is characterized by using infrared light to calculate the depth information and using visible radiation to capture an ordinary image. By attaching the light-transmitting plate 1, of which the upper surface is mostly covered with the infrared reflecting mirror 1b but has some infrared reflector's openings, onto the image capturing plane of the image sensor 2, the infrared light image can be detected from the images captured. And based on the shape of the image detected and by reference to the pre-compiled information defining the correspondence between the shape and the depth, the subject's depth can be calculated effectively. The amount of depth information is determined by the number of the infrared reflector's openings. That is why the larger the number of infrared reflector's openings provided, the greater the amount of depth information collected. Conversely, the smaller the number of such openings provided, the smaller the amount of depth information collected. In addition, according to this embodiment, not just the depth information but also an ordinary image, of which the resolution has not decreased at all, can be obtained as well.

Figure 7:
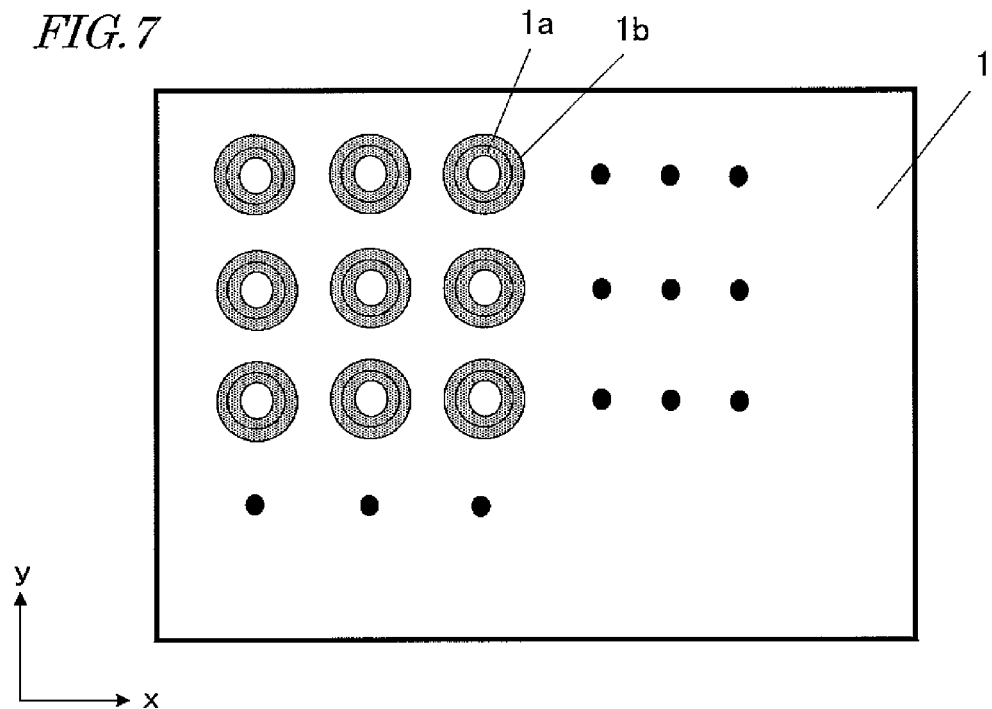
FIG. 7 A plan view illustrating a first modified example of the light-transmitting plate according to the first exemplary embodiment.

In the embodiment described above, most of the light-transmitting plate 1 is supposed to be covered with the infrared reflecting mirror 1b. However, such a configuration does not have to be adopted. Rather any other configuration may also be adopted as long as the light reflected from the infrared reflecting mirrors 1a and 1b is incident on a group of photosensitive cells that are located within a limited range. For example, the infrared reflecting mirrors 1b may be arranged only in limited areas as shown in FIG. 7. In this example, the rest of the light-transmitting plate 1 which is not covered with the infrared reflecting mirrors 1a and 1b may be either transparent to infrared light or opaque. Also, in the embodiment described above, one infrared reflector's opening is supposed to be provided for approximately every 20 pixels. However, this is just an exemplary designed value. If the number of infrared reflector's openings provided is further increased, the depth information can be calculated more precisely. Nevertheless, if the infrared reflector's openings were arranged too densely, then adjacent ringlike patterns could overlap with each other to possibly make it difficult to estimate the depths. That is why this designed value is determined by the specifications of the depth information required. Furthermore, in the depth estimating mode of the embodiment described above, an image is supposed to be captured in advance with the infrared cut filter 4 removed from the image capturing optical system. Alternatively, an infrared transmitting filter which transmits only an infrared ray may also be inserted into the image capturing optical system instead of the infrared cut filter 4. Since the image IMGi can be obtained directly in that case, there is no need to capture an image in advance or perform the inter-frame differential processing. In such a situation, one or both of the infrared reflecting mirrors 1a and 1b may have a property to reflect infrared light and does not have to transmit light.

Figure 8A:
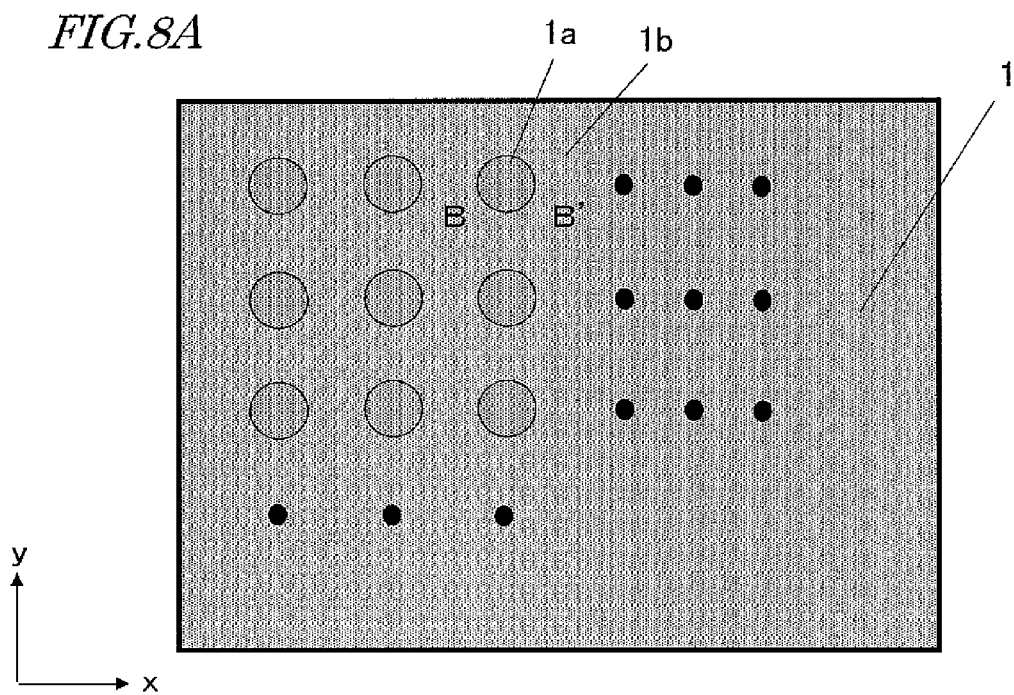
FIG. 8A A plan view illustrating a second modified example of the light-transmitting plate according to the first exemplary embodiment.
Figure 8B:
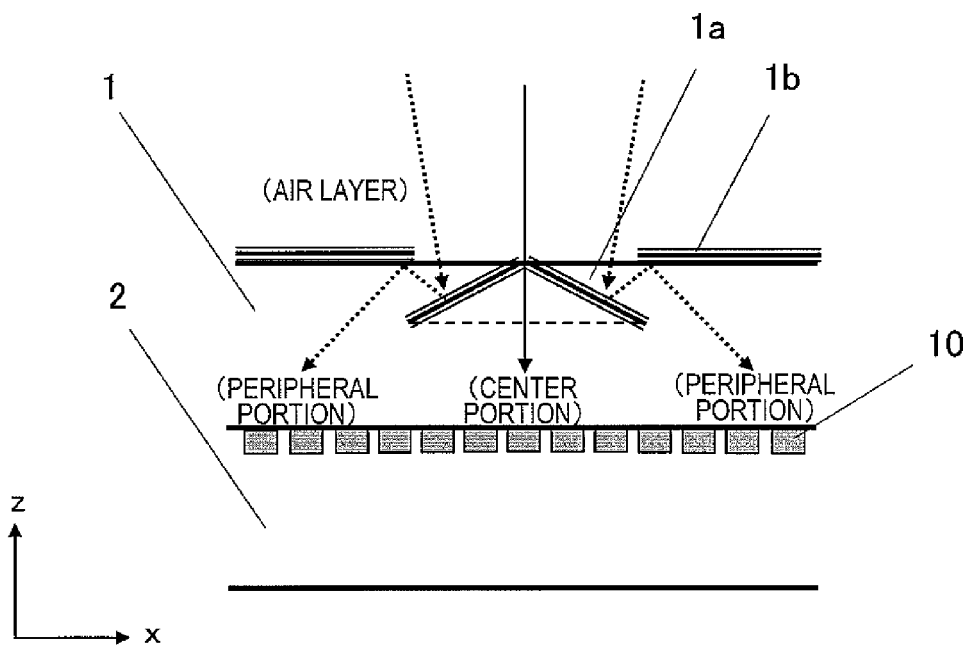
FIG. 8B A cross-sectional view as viewed on the plane B-B' shown in FIG. 4A.

As far as the light-transmitting plate 1 is concerned, the light-transmitting plate 1 does not have to have the configuration of the embodiment described above but may also have the configuration shown in FIGS. 8A and 8B. FIG. 8A is a plan view illustrating the light-transmitting plate 1 and FIG. 8B is a cross-sectional view as viewed on the plane B-B' shown in FIG. 8A. In this example, each infrared reflector's opening is entirely covered with an infrared reflecting mirror 1a, which has an umbrella shape. Even if the infrared reflecting mirror 1a has such a shape, ringlike images can also be produced by the light reflected from the infrared reflecting mirrors 1a and 1b, and therefore, depth information can also be calculated by performing similar processing.

Figure 9:
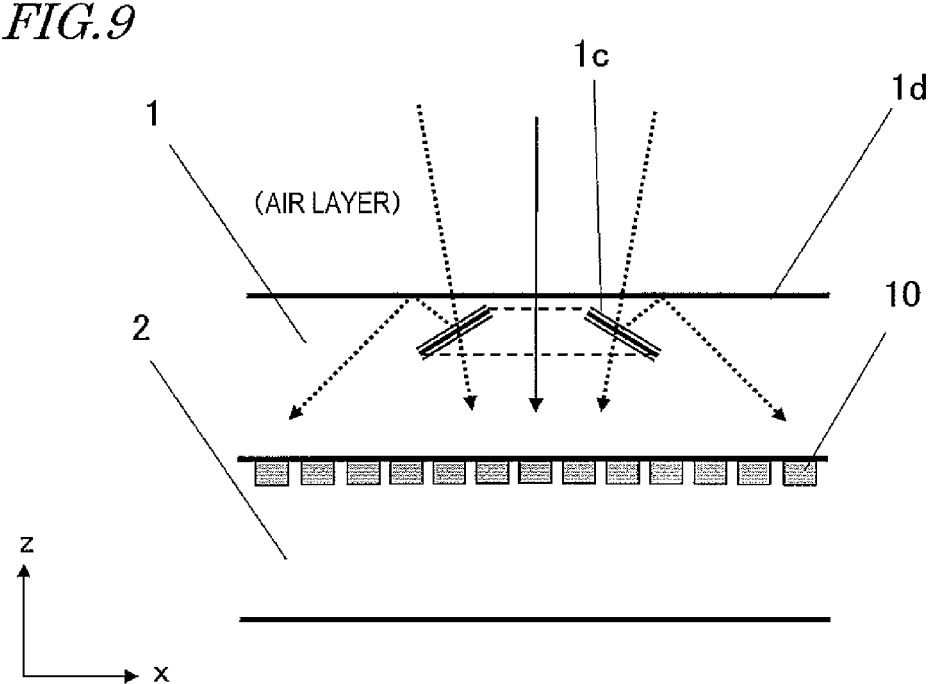
FIG. 9 A cross-sectional view illustrating a third modified example of the light-transmitting plate according to the first exemplary embodiment.
Figure 10:
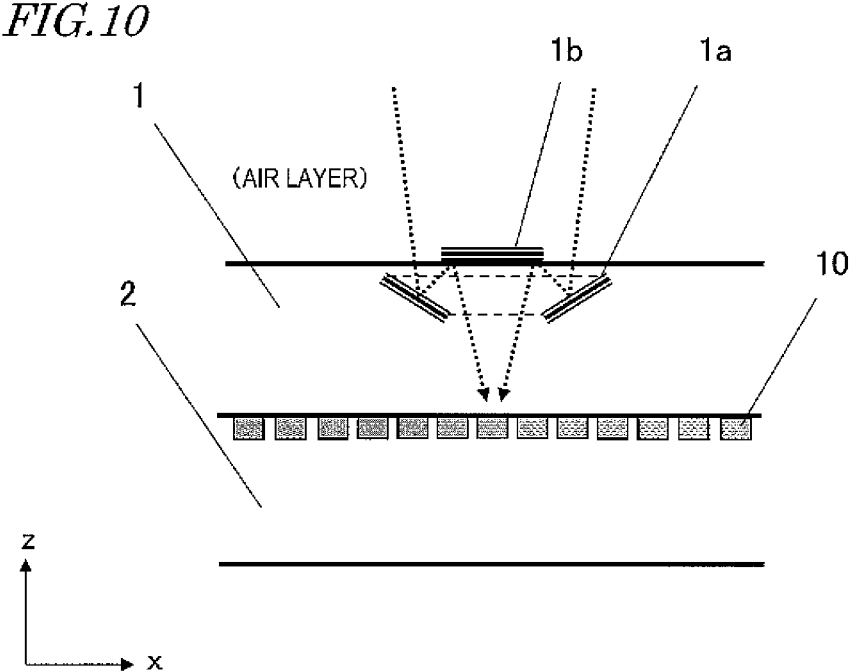
FIG. 10 A cross-sectional view illustrating a fourth modified example of the light-transmitting plate according to the first exemplary embodiment.

Still alternatively, a light-transmitting plate 1 with the cross-sectional structure shown in FIG. 9 or 10 may also be used. Specifically, in the example illustrated in FIG. 9, the infrared cut filter 4 is always kept inserted into the image capturing optical system, a half mirror 1c is used, and the light reflected from the half mirror 1c gets totally reflected from the interface 1d between the light-transmitting plate 1 and the external air layer to be incident on the photosensitive cells 10. That part of the light that has been reflected from the half mirror is and incident on the photosensitive cells 10 has such high lightness that depth information can be calculated by detecting that part. In that case, however, the resultant image will be affected by the half mirror 1c and will get blurred to some extent. Thus, to obtain an image that is not affected by the half mirror 1c, the PSF (point spread function) needs to be calculated in advance around the region under the half mirror 1c and image restoration processing using that PSF needs to be included in the processing to be carried out by the image processing section 7. In the example illustrated in FIG. 9, the half mirror 1c corresponds to the first mirror and the interface 1d between the light-transmitting plate 1 and the air layer corresponds to the second mirror. As can be seen, in this description, the "mirror" is not necessarily an optical system that transmits light falling within a particular wavelength range.

In the example illustrated in FIG. 10, the tilt angle of the infrared reflecting mirror 1a is changed so that the light reflected from the infrared reflecting mirrors 1a and 1b is condensed onto a region that is located right under the infrared reflecting mirror 1b. If such a structure is adopted, a ringlike image will be produced right under and inside the infrared reflecting mirror 1a. However, by performing similar processing to what has already been described, the subject's depth information can also be calculated.

Optionally, in the embodiment described above, the infrared reflecting mirrors 1a and 1b that reflect infrared light may be replaced with an optical member that reflects light falling within any other wavelength range. In that case, by using an optical filter that cuts off light falling within that wavelength range instead of the infrared cut filter 4, the depth information can also be obtained by performing similar processing. To obtain an ordinary image using such a configuration, the infrared cut filter 4 needs to be arranged to filter out infrared light and an optical filter that cuts off light falling within the wavelength range also needs to be arranged.

Furthermore, in the embodiment described above, if the infrared reflecting mirror 1a is projected onto a plane that is parallel to the upper surface of the light-transmitting plate 1, either a circular shadow or a ringlike shadow will be cast there. However, the shadow does not always have to be such a shape. Alternatively, the infrared reflecting mirror 1a may also have a tilted flat plate shape or a striped shape. Also, when the infrared reflecting mirrors 1a and 1b are projected onto a plane that is parallel to the upper surface of the light-transmitting plate 1, the shadow of the infrared reflecting mirror 1b does not have to surround that of the infrared reflecting mirror 1a but their shadows may form any other pattern as long as light is reflected from those two mirrors.

In the embodiment described above, the depth of a subject is supposed to be estimated by sensing the radius of an area on the image capturing plane that is irradiated with light beams that have been reflected from two mirrors. However, the depth does not always have to be estimated based on the radius of such an area. Alternatively, the depth may also be estimated based on the area or the number of photosensitive cells instead of the radius. Also, if the light-transmitting plate 1 is configured so that the shape or the distribution of the quantities of light received at that area and the depth are correlated with each other and if the correlation between the shape and the depth is checked out in advance, then the depth can also be estimated based on the shape or the distribution of the quantities of light received, not the size of that area. It should be noted that the area to be irradiated with a light beam that has come from a point on the subject can be evaluated based on the intensities of photoelectrically converted signals supplied from a plurality of photosensitive cells. The shape and size of the irradiated area can be detected based on the distribution of photosensitive cells that output photoelectrically converted signals, of which the intensities are equal to or greater than a predetermined value. In addition, the distribution of the quantities of light received at the irradiated area can also be obtained based on the distribution of the signal intensities.

In the embodiment described above, the image processing is supposed to be carried out by the image processing section 7 which is built in the image capture device. However, such image processing may also be carried out by another device that is provided independently of that image capture device. For example, even if a signal that has been obtained by an image capture device including the image capturing section 100 of this embodiment is loaded into another device (image processor) to get a program defining the signal arithmetic processing described above executed by a computer in that another device, the effects of the embodiments described above can also be achieved. If the image processing is supposed to be carried out by an external image processor, the image capture device does not have to include the image processing section.

Embodiment 2

Next, an image capture device as a second embodiment will be described. Before this embodiment is described in detail, however, the basic idea of the image capture device of this embodiment will be described briefly.

An image capture device according to this embodiment includes: an image sensor having a plurality of photosensitive cells arranged on its image capturing plane; an optical lens which is arranged to condense light on the image capturing plane of the image sensor; a light-transmitting member which is arranged on the image capturing plane; and a signal processing section which processes the output signals of the plurality of photosensitive cells. The light-transmitting member has a light beam splitting area that divides a light beam falling within a particular wavelength range, which has come from a portion of a subject through the optical lens, into at least three light beams. The light beam splitting area is made up of at least three partial areas including first, second and third partial areas. The light beam splitting area has first and second mirrors, which are arranged inside of the area, and also has a third mirror, which is arranged on the upper surface of that area. In this description, the "upper surface" refers herein to one of the surfaces of the light-transmitting member that is opposite to another surface thereof with the image sensor. The first, second and third mirrors have the same reflection property and are designed so as to reflect light falling within a particular wavelength range.

The "particular wavelength range" may be a wavelength range, of which the lower limit is longer than 650 nm, for example, but may also be a visible radiation wavelength range.

The first mirror is arranged in the first partial area. The second mirror is arranged in the second partial area. The first and second mirrors have a reflective surface which is tilted with respect to the upper surface of the light beam splitting area. On the other hand, the third mirror has a reflective surface which is parallel to the upper surface of the light beam splitting area.

In an image capture device with such a configuration, the light beam falling within the particular wavelength range that has been incident on the light beam splitting area from a portion of the subject through the optical lens follows the following path: the light beam that has been incident on the first partial area of the light beam splitting area is reflected at least partially from the first mirror inside and further reflected from the third mirror on the upper surface and irradiates a first group of photosensitive cells. The light beam that has been incident on the second partial area of the light beam splitting area is reflected at least partially from the second mirror inside and further reflected from the third mirror on the upper surface, and irradiates a second group of photosensitive cells. The light beam that has been incident on the third partial area of the light beam splitting area irradiates a third group of photosensitive cells without being reflected from the first or second mirror. In this case, the first, second and third groups of photosensitive cells are typically three groups of photosensitive cells which are located in respective areas on the image capturing plane that face the first, second and third partial areas, respectively. To avoid superposing the photoelectrically converted signals, it is recommended that the first, second and third groups of photosensitive cells do not overlap with each other.

In this case, the first, second and third mirrors are arranged so that distributions of the quantities of light received to be sensed by the first, second and third groups of photosensitive cells are different from each other. That is to say, a light beam that has been incident on a single light beam splitting area from the same point on the subject through the same optical lens is reflected differently from the first, second and third partial areas, thus changing the spatial distribution of the quantities of light. As a result, the first, second and third groups of photosensitive cells come to have mutually different numbers of cells, different shapes of irradiated areas, and different output peak, average and variance values.

Furthermore, since the first, second and third partial areas cause mutually different reflection actions, the distribution of the quantities of light received to be sensed by each of those groups of photosensitive cells varies according to the depth of that portion of the subject. This is because if the depth of that portion of the subject is different, the light will be incident on the light beam splitting area at a different angle of incidence and eventually the light reflected from each of those reflective mirrors will go in a different direction. This means that there is a correlation between the distribution of the quantities of light received to be sensed by each group of photosensitive cells and the depth.

According to this embodiment, from the light that has been incident on the image capturing plane of the image sensor and is going to be photoelectrically converted, its components that have come after having been reflected from the first, second and third mirrors are extracted, thereby detecting the distribution of the quantities of light received and peak values of respective photosensitive cells irradiated with the light having those components. And by analyzing the results of detection, information indicating the subject's depth (which will be referred to herein as "depth information") can be obtained. Specific processing for generating such depth information will be described later.

In this embodiment, the image capture device itself includes an image processing section and generates information indicating the subject's depth (which will be referred to herein as "depth information") by itself. However, even if the image capture device does not generate the depth information by itself but if a photoelectrically converted signal obtained by capturing an image is sent to another device, that another device may generate the depth information instead. In this description, such an image capture device that does not generate the depth information by itself but that provides necessary information to generate the depth information will also be referred to herein as a "depth estimating image capture device".

Hereinafter, the configuration and operation of an image capture device according to this embodiment will be described in detail. The image capture device of this embodiment has the same overall configuration as what is illustrated in FIG. 1. In this embodiment, the light-transmitting plate 1 has a different configuration and the image processing section 7 performs different processing from their counterparts of the first embodiment. Thus, the following description of this second embodiment will be focused on only those differences from the first embodiment and their common features will not be described all over again.

Figure 11A:
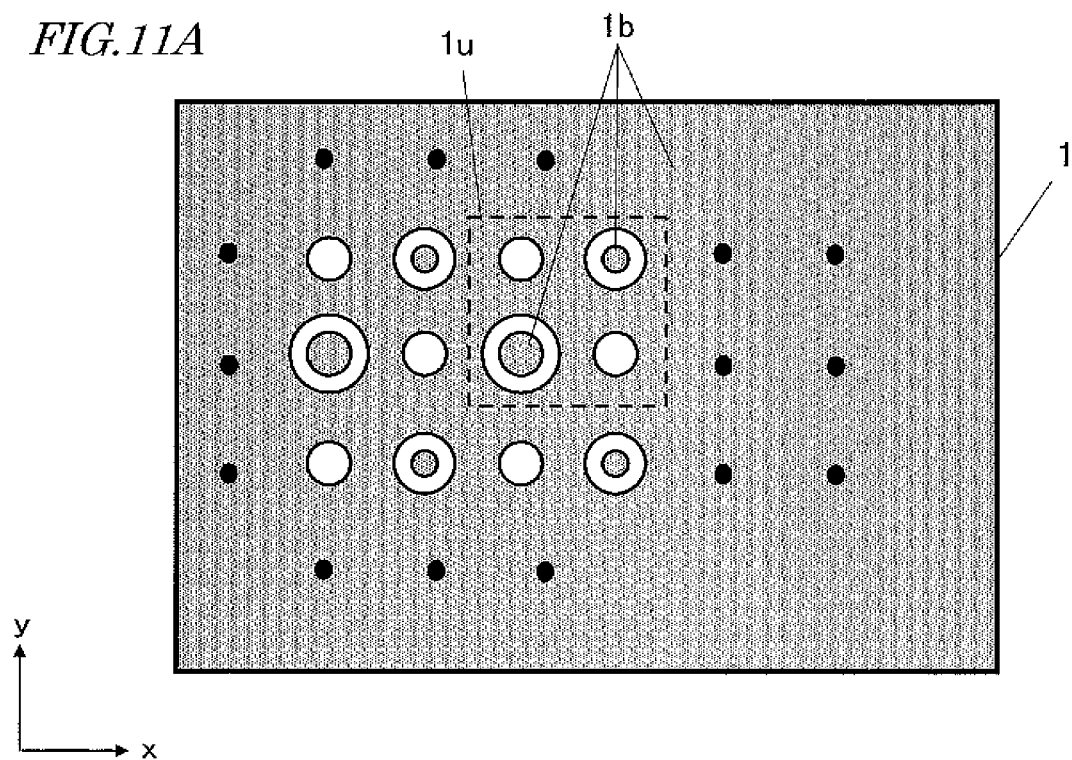
FIG. 11A A plan view illustrating a light-transmitting plate as a second exemplary embodiment.

FIG. 11A is a plan view illustrating the configuration of a part of the light-transmitting plate 1. The surface of the light-transmitting plate 1 is mostly covered with the infrared reflecting mirror 1b but has some circular or ringlike infrared reflector's openings which are not covered with the infrared reflecting mirror 1b. In this embodiment, the light-transmitting plate 1 is a set of a number of light beam splitting areas 1u. In the following description, a light beam that can be regarded as substantially uniform is supposed to enter a single light beam splitting area 1u from a portion of the subject through the optical lens 3. The light beam splitting area 1u of this embodiment is designed so that a light beam falling within the infrared range, which is included in that incoming light beam, is divided into four partial light beams and incident on mutually different groups of photosensitive cells. In this embodiment, the light-transmitting plate 1 is made of a transparent glass material and is attached onto the photosensitive cells of the image sensor 2. However, the light-transmitting plate 1 does not have to be made of glass but may also be made of any other material as long as the light-transmitting plate 1 can transmit light.

Figure 11B:
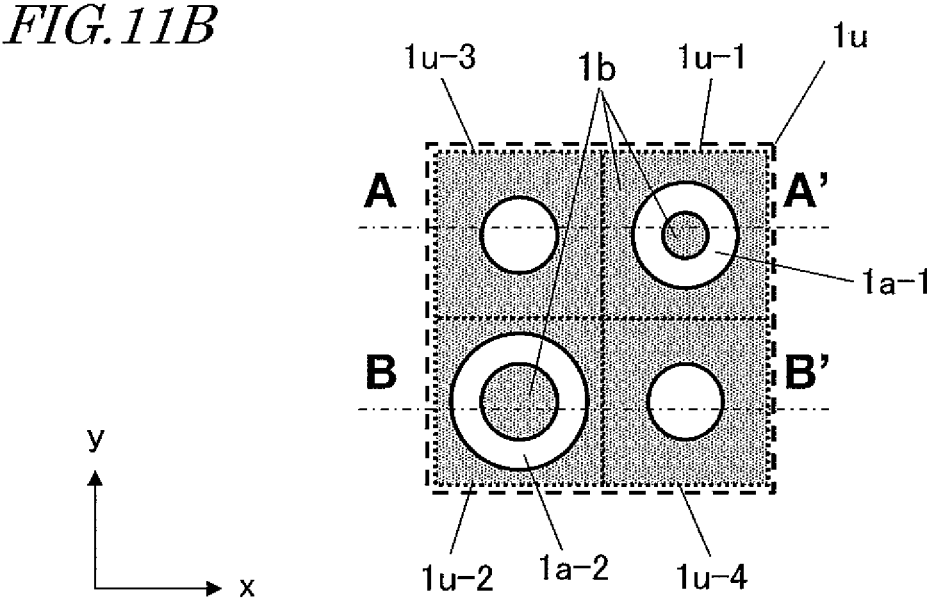
FIG. 11B A plan view illustrating the fundamental configuration of the light-transmitting plate according to the second exemplary embodiment.

FIG. 11B is a plan view illustrating a single light beam splitting area 1u of the light-transmitting plate 1. The light beam splitting area 1u is comprised of four partial areas, which are arranged in two rows and two columns. Although the boundary between the four partial areas illustrated in FIG. 11B is indicated by the dotted lines, actually there are no definite border lines like this. In the first partial area 1u-1 which is located at the row 1, column position, an infrared reflecting mirror 1b with a first ringlike infrared reflector's opening is arranged on its upper surface and an infrared reflecting mirror 1a-1 which reflects the infrared ray that has passed through the first infrared reflector's opening is arranged inside. In the second partial area 1u-2 which is located at the row 2, column 1 position, an infrared reflecting mirror 1b with a second ringlike infrared reflector's opening of a different size is arranged on its upper surface and an infrared reflecting mirror 1a-2 which reflects the infrared ray that has passed through the second infrared reflector's opening is arranged inside. The third and fourth partial areas located at the row 1, column 1 position and the row 2, column 2 position, respectively, have the same pattern. An infrared reflecting mirror 1b with a circular infrared reflector's opening is arranged on the upper surface of each of the third and fourth partial areas 1u-3 and 1u-4.

Figure 11C:
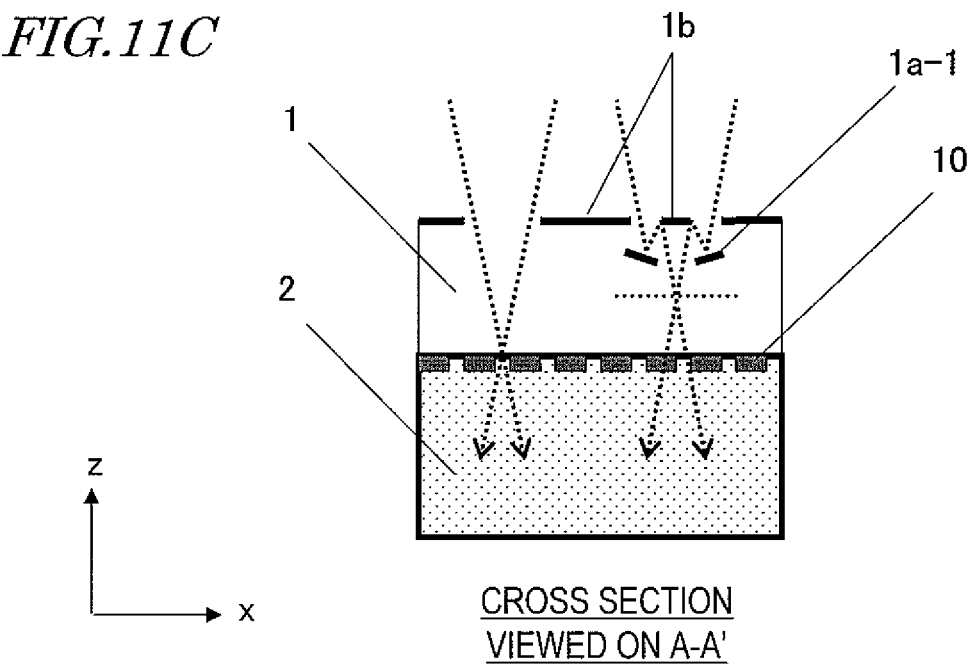
FIG. 11C A cross-sectional view of the light-transmitting plate according to the second exemplary embodiment as viewed on the plane A-A'.

FIG. 11C is a cross-sectional view as viewed on the plane A-A' shown in FIG. 11B. In FIG. 11C, a half of the light-transmitting plate 1 shown on the right-hand side is the first partial area 1u-1 and the other half shown on the left-hand side is the third partial area 1u-3. The ringlike infrared reflecting mirror 1a-1, of which the reflective surface is tilted with respect to the upper surface, is arranged inside the first partial area 1u-1. The tilt angle and the depth (as measured from the upper surface) of the infrared reflecting mirror 1a-1 are designed so that the infrared light is reflected from itself toward a portion of the infrared reflecting mirror 1b that is surrounded with the first infrared reflector's opening. The infrared light that has been reflected from the infrared reflecting mirror 1a-1 is further reflected from that portion of the infrared reflecting mirror 1b and incident on some of the photosensitive cells 10 of the image sensor 2. On the other hand, no reflective mirrors are provided inside the third partial area 1u-3. That is why the infrared light that has passed through the circular infrared reflector's opening of the third partial area 1u-3 will irradiate some of the photosensitive cells 10 without being reflected after that.

Figure 11D:
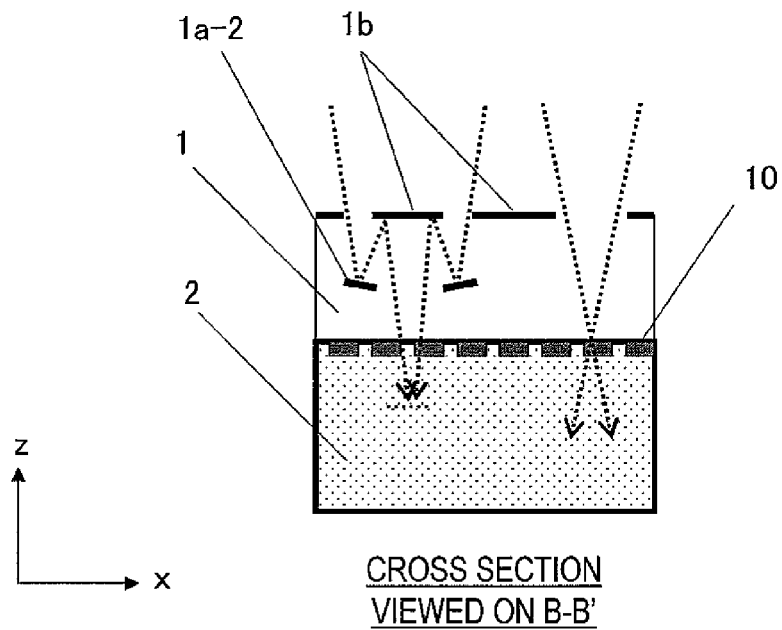
FIG. 11D A cross-sectional view of the light-transmitting plate according to the second exemplary embodiment as viewed on the plane B-B'.

FIG. 11D is a cross-sectional view as viewed on the plane B-B' shown in FIG. 11B. In FIG. 11D, a half of the light-transmitting plate 1 shown on the left-hand side is the second partial area 1u-2 and the other half shown on the right-hand side is the fourth partial area 1u-4. The ringlike infrared reflecting mirror 1a-2, of which the reflective surface is tilted with respect to the upper surface, is arranged inside the second partial area 1u-2. The tilt angle and the depth (as measured from the upper surface) of the infrared reflecting mirror 1a-2 are designed so that the infrared light is reflected from itself toward a portion of the infrared reflecting mirror 1b that is surrounded with the second infrared reflector's opening. The infrared light that has been reflected from the infrared reflecting mirror 1a-2 is further reflected from that portion of the infrared reflecting mirror 1b and incident on some of the photosensitive cells 10 of the image sensor 2. On the other hand, no reflective mirrors are provided inside the fourth partial area 1u-4. That is why the infrared light that has passed through the circular infrared reflector's opening of the fourth partial area 1u-4 will irradiate some of the photosensitive cells 10 without being reflected after that.

In this embodiment, the infrared reflecting mirrors 1a-1, 1a-2 and 1b function as the first, second and third mirrors, respectively. Each of the first through third mirrors may be divided into multiple portions as is done in this embodiment.

Each of these infrared reflecting mirrors 1a-1, 1a-2 and 1b has a property to reflect mainly infrared light and transmit visible radiation falling within any other wavelength range. In this description, the "infrared light" refers herein to an electromagnetic wave, of which the wavelength is longer than 650 nm, for example. By using such infrared reflecting mirrors 1a-1, 1a-2 and 1b, visible radiation, which is perceptible for a human being, can be incident on the image sensor 2 without being reflected.

The light-transmitting plate 1 including the infrared reflecting mirrors 1a-1, 1a-2 and 1b shown in FIGS. 11C and 11D may be made by depositing and patterning a thin film by known lithography and etching techniques. For example, first of all, two kinds of conical recesses are formed at predetermined positions on a transparent substrate so as to form a particular pattern. Next, a multilayer dielectric film, including multiple layers that have had their refractive index and thickness designed so as to reflect only infrared light and transmit any other visible radiation, is deposited. Then, unnecessary portions of the multilayer film deposited are etched away, thereby forming infrared reflecting mirrors 1a-1 and 1a-2. Subsequently, a transparent layer is further deposited thereon and shaped so as to have a flat upper surface. Finally, a multilayer dielectric film having the same reflection and transmission property as the infrared reflecting mirrors 1a-1 and 1a-2 is deposited over the entire surface except the regions over the infrared reflecting mirrors 1a-1 and 1a-2, thereby forming an infrared reflecting mirror 1b. In this manner, the light-transmitting plate 1 can be made. The light-transmitting plate 1 thus obtained may be bonded onto the image capturing plane of the image sensor 2 and combined with the image sensor 2.

With such a configuration adopted, in the normal shooting mode in which an image is shot with the infrared cut filter 4 introduced into the optical path, the light incident on this image capture device during an exposure process is transmitted through the lens 3, the infrared cut filter 4 and the light-transmitting plate 1, imaged on the image capturing plane of the image sensor 2, and then photoelectrically converted by the respective photosensitive cells 10. In this mode, the infrared ray components are filtered out by the infrared cut filter 4, and therefore, the incident light is photoelectrically converted without being affected by the infrared reflecting mirrors 1a-1, 1a-2 and 1b which are arranged either on the surface or inside of the light-transmitting plate 1.

In the depth estimating mode in which an image is shot with the infrared cut filter 4 removed from the optical path, on the other hand, the light incident on this image capture device during the exposure process is transmitted through the lens 3 and light-transmitting plate 1, imaged on the image capturing plane of the image sensor 2, and then photoelectrically converted by the respective photosensitive cells 10. In this mode, since the incoming light is not passed through the infrared cut filter 4, the incoming light is affected by the infrared reflecting mirrors 1a-1, 1a-2 and 1b which are arranged on the surface or inside of the light-transmitting plate 1 as will be described later.

The photoelectrically converted signals are supplied from the respective photosensitive cells 10 to the signal processing section 200 by way of the signal generating and receiving section 5. In the signal processing section 200, the image processing section 7 generates an image based on the signals supplied in the normal shooting mode. As a result, an ordinary image can be obtained without decreasing its resolution. In the depth estimating mode, on the other hand, the image processing section 7 calculates the depth information by performing the following processing. It should be noted that the ordinary image is generated by the image generating section 7a in the image processing section 7 and the depth information is generated by the depth information generating section 7b in the image processing section 7.

Hereinafter, the depth estimating mode will be described in detail. It should be noted that before entering this mode, the image capture device needs to capture one image in the normal shooting mode. In the depth estimating mode, the incoming light is directly incident on the light-transmitting plate 1 through the lens 3 but most of the infrared ray components of the incoming light are reflected by the infrared reflecting mirror 1b. Meanwhile, the infrared ray components that have entered through the infrared reflector's openings of the light-transmitting plate 1 are either directly incident on the photosensitive cells 10 or reflected from the infrared reflecting mirrors 1a-1, 1a-2, further reflected from the infrared reflecting mirror 1b and then incident on the photosensitive cells 10. The size of one light beam splitting area, which is the fundamental unit of the light-transmitting plate 1, may be the size of approximately 20 pixels in both of the x and y directions. However, the size of one light beam splitting area does not have to be such a size but may also be any other size as long as the infrared light that has be transmitted through each partial area can irradiate multiple photosensitive cells. Also, the thickness of the light-transmitting plate 1 and the shape and position of the infrared reflecting mirrors 1a-1 and 1a-2 are set so that the infrared light reflected from the infrared reflecting mirrors 1a-1, 1a-2 and 1b fall within that range of 20 pixels. As the infrared reflector's opening has such an optical structure, there are a lot of infrared ray components right under the center of that opening.

In this embodiment, two partial areas of a single light beam splitting area, which are located at the row 1, column 1 position and at the row 2, column 2 position, respectively, have the same structure, and no infrared reflecting mirrors are provided inside of any of those partial areas. On the other hand, inside of the partial areas located at the row 1, column 2 position and at the row 2, column 1 position, respectively, arranged are the infrared reflecting mirrors 1a-1 and 1a-2 and their shapes and arrangements are different. As shown in FIG. 11C, the pattern at the row 1, column 2 position has a shorter imaging point than the pattern at the row 1, column 1 position. On the other hand, as shown in FIG. 11D, the pattern at the row 2, column 1 position has a longer imaging point than the pattern at the row 1, column 1 position. As a result, three imaging states, in which the lengths from the upper surface to the imaging points are different from each other, can be produced.

Generally speaking, if three images in mutually different imaging states are available, the distance to the subject can be estimated based on those images. In such images in different imaging states, the closer to a photosensitive cell their imaging point is, the higher its signal level should be. That is why the signals supplied from first, second and third groups of photosensitive cells that face the first, second and third partial areas, respectively, have mutually different peak values of their signal levels. Also, as the depth of a subject changes, the ratio of the peak values of their signal levels also changes. Thus, according to this embodiment, correspondence between the peak values of photoelectrically converted signals supplied from the groups of photosensitive cells that face those partial areas and the distance from the image capture device to the subject is inspected in advance via experiments or simulations and information representing such a correlation is stored as a database. Such a database may be stored in a storage medium such as the memory 30. Thus, the depth information generating section 7b can estimate the subject's depth by reference to the correlation that has been found in advance by monitoring the three kinds of imaging states based on the photoelectrically converted signals. That database may be a collection of pieces of information representing ratios such as "the peak value of a pixel signal supplied from a first group of photosensitive cells: the peak value of a pixel signal supplied from a second group of photosensitive cells: the peak value of a pixel signal supplied from a third group of photosensitive cells: depth". In this embodiment, since the third and fourth partial areas 1u-3 and 1u-4 have the same structure, the average signal levels of photosensitive cells that are located in respective areas of the image capturing plane that face those partial areas are used.

Figure 12:
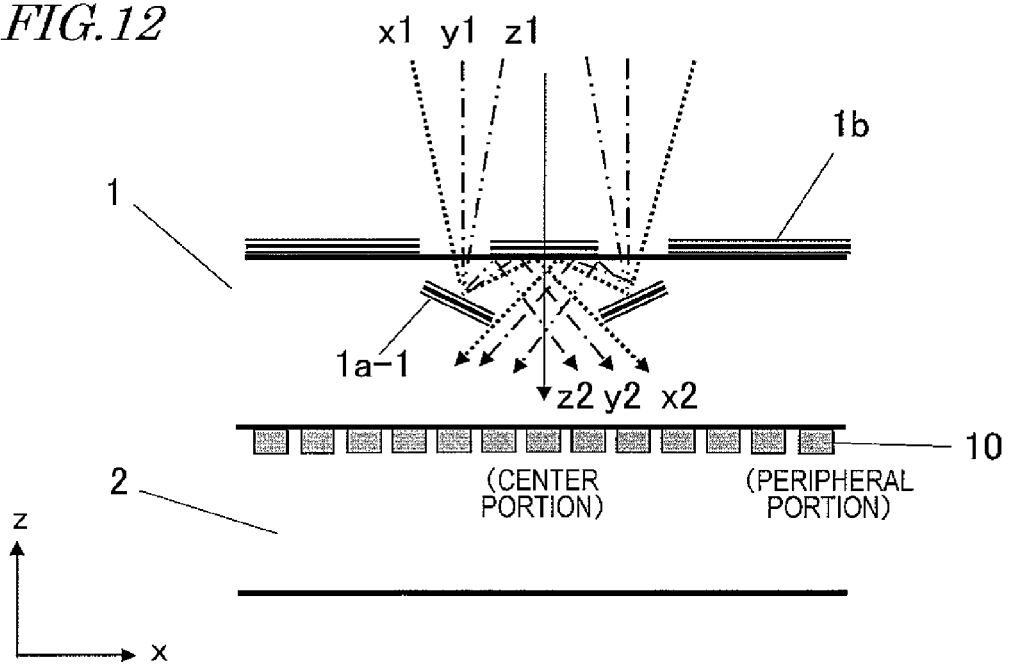
FIG. 12 A view illustrating conceptually how light is incident on the light-transmitting plate according to the second exemplary embodiment.

Next, it will be described with reference to FIG. 12 how the distribution of the quantities of light received at a group of photosensitive cells to be irradiated with infrared light that has come from a portion of a subject and that has entered a single partial area through the optical lens 3 varies according to the depth of that portion of the subject. As an example, suppose a situation where infrared light has entered the first partial area 1u-1. FIG. 12 illustrates conceptually how the degree of convergence of the light that has come from a portion of the subject and is going to be incident on the first partial area 1u-1 varies according to the depth of that portion of the subject. In FIG. 12, the dotted lines indicate the path of the light ray in a situation where the incoming light is so converged by the lens 3 that the center of imaging is located closer to the image sensor 2 than the light-transmitting plate 1 is. In that case, the light ray travels in the order of x1 and x2. On the other hand, in FIG. 12, the one-dot chains indicate the path of the light ray in a situation where the center of imaging of the incoming light is located right on the light-transmitting plate 1 and the incoming light can be regarded as being incident substantially perpendicularly to the upper surface of the light-transmitting plate 1. In that case, the light ray travels in the order of y1 and y2. Furthermore, in FIG. 12, the two-dot chains indicate the path of the light ray in a situation where the center of imaging of the incoming light is located over the light-transmitting plate 1. In that case, the light ray travels in the order of z1 and z2. These light rays will have mutually different distributions of the quantities of light on the image capturing plane of the image sensor 2, and therefore, the distributions of the quantities of light received to be detected by the groups of photosensitive cells will also be different. Consequently, the distribution of the quantities of light received at a group of photosensitive cells to be irradiated with infrared light that has come from a portion of a subject and that has entered a single partial area through the optical lens 3 varies according to the depth of that portion of the subject.

Next, it will be described how this image capture device operates in the depth estimating mode. In the following description, the subject is supposed to stand still. First of all, the image capture device captures an image and saves it in the memory 30. Such an image will be identified herein by IMGa. It should be noted that another image IMGb that had been captured in the normal shooting mode just before the image capture device entered this mode should also be saved in the memory 30. Next, the image processing section 7 performs inter-frame differential processing on these images IMGa and IMGb. In this case, in capturing an image in this depth estimating mode, the image sensor 2 receives visible radiation and infrared light in a region that faces the infrared reflector's opening and in its surrounding region but receives only visible radiation everywhere else. In the normal shooting mode, on the other hand, the image sensor 2 receives only visible radiation in the entire photosensing area. That is why by performing the inter-frame differential processing, an image IMGi produced by the infrared light that has entered through the infrared reflector's opening can be detected. The depth information generating section 7b of the image processing section 7 calculates the distance to the subject by reference to a database that has been compiled in advance by measuring the level of the photoelectrically converted signal right under each partial area to define the relation between the peak value of the pixel signal and the distance from the image capture device to the subject. Furthermore, the depth information generating section 7b of the image processing section 7 outputs not only the image IMGb but also a position on the image IMGb corresponding to the position of each infrared reflector's opening and the depth information calculated to an external device via an interface section 8. Optionally, the depth information generating section 7b may obtain the distribution of the depths of respective points on the subject and may generate and output a depth image representing that distribution.

This series of operations can be summarized by the flowchart shown in FIG. 13. First of all, the image capture device performs a shooting session in the normal shooting mode, thereby generating a visible radiation image IMGb (in Step S131). Next, the image capture device performs a shooting session in the depth estimating mode, thereby generating a visible radiation/infrared light image IMGa (in Step S132). Thereafter, the depth information generating section 7b performs inter-frame difference calculating processing between IMGa and IMGb to generate an infrared light image IMGi (in Step S133). Then, the depth information generating section 7b detects a signal peak value of IMGi (in Step S134). Subsequently, by reference to the database that has been compiled in advance to define the relation between the peak value and the subject distance with the peak value measured, the depth information generating section 7b obtains the distance to the subject (in Step S135). Finally, the depth information generating section 7b outputs information representing the subject distance (in Step S136).

As described above, according to this embodiment, two image capturing sessions are carried out in a row in a first state in which the infrared cut filter 4 is introduced into the optical path (i.e., in the normal shooting mode) and in a second state in which the infrared cut filter 4 is removed from the optical path. These two consecutive image capturing sessions can be carried out by making the signal generating and receiving section 5 shown in FIG. 1 control the operations of the filter driving section 4a and the sensor driving section 6. The image capture device of this embodiment is characterized by using infrared light to calculate the depth information and using visible radiation to capture an ordinary image. By attaching the light-transmitting plate 1, of which the upper surface is mostly covered with the infrared reflecting mirror 1b, which has infrared reflecting mirrors 1a-1 and 1a-2 inside, and which has a plurality of infrared reflector's openings, onto the image capturing plane of the image sensor 2, the infrared light image can be detected from the images captured. And based on the distribution of the quantities of light received that has been detected by the group of photosensitive cells associated with each partial area of the light-transmitting plate 1, the depth information can be calculated effectively. The amount of depth information is determined by the number of the light beam splitting areas 1u. That is why the larger the number of the light beam splitting areas 1u provided, the greater the amount of depth information collected. In addition, according to this embodiment, not just the depth information but also an ordinary image, of which the resolution has not decreased at all, can be obtained as well.

In the depth estimating mode of the embodiment described above, an image is supposed to be captured in advance with the infrared cut filter 4 removed from the image capturing optical system. Alternatively, an infrared transmitting filter which transmits only an infrared ray may also be inserted into the image capturing optical system instead of the infrared cut filter 4. Since the image IMGi can be obtained directly in that case, there is no need to capture an image in advance or perform the inter-frame differential processing. In such a situation, the infrared reflecting mirrors 1a-1, 1a-2 and 1b may have a property to reflect infrared light and does not have to transmit light.

Optionally, the infrared reflecting mirrors 1a-1, 1a-2 and 1b that reflect infrared light may be replaced with an optical member that reflects light falling within any other wavelength range. In that case, by using an optical filter that cuts off light falling within that wavelength range instead of the infrared cut filter 4, the depth information can also be obtained by performing similar processing. To obtain an ordinary image using such a configuration, the infrared cut filter 4 needs to be arranged to filter out infrared light and an optical filter that cuts off light falling within the wavelength range also needs to be arranged.

Furthermore, in the embodiment described above, if the infrared reflecting mirror 1a-1, 1a-2 is projected onto a plane that is parallel to the upper surface of the light-transmitting plate 1, a ringlike shadow will be cast there. However, the shadow does not always have to be such a shape. Alternatively, the infrared reflecting mirror 1a-1, 1a-2 may also have a flat plate shape. Also, when the infrared reflecting mirrors 1a-1, 1a-2 and 1b are projected onto a plane that is parallel to the upper surface, the shadow of the infrared reflecting mirror 1b does not have to surround those of the infrared reflecting mirrors 1a-1, 1a-2 but their shadows may form any other pattern as long as light is reflected from those two mirrors.

In the embodiment described above, the depth information of a portion of the subject is supposed to be obtained based on the ratio of the peak values of the quantities of light received to be detected by respective groups of photosensitive cells that are associated with respective partial areas of each light beam splitting area 1u. However, the depth information may also be obtained based on any other kind of information. For example, as a ringlike image is obtained at each infrared reflector's opening in the embodiment described above, the depth of each point of the subject may be calculated based on the ratio of the radii of respective ringlike images. Alternatively, the distribution itself of the quantities of light received to be detected by each group of photosensitive cells may also be used. For example, the depth may be calculated based on the average or variance of the respective quantities of light received to be detected by the respective groups of photosensitive cells. In that case, information defining the correlation between the distribution of the quantities of light received to be detected by the respective groups of photosensitive cells and the depth may be collected in advance.

Furthermore, in the embodiment described above, the light-transmitting plate 1 is supposed to have a plurality of light beam splitting areas 1u that are arranged two-dimensionally. However, the light-transmitting plate 1 has only to have at least one light beam splitting area 1u. With at least one light beam splitting area provided, the depth of a point of the subject can be obtained. Likewise, a single light beam splitting area 1u does not have to have the 2×2 arrangement shown in FIG. 11B but may have any other arrangement as well. Furthermore, a single light beam splitting area 1u does not have to be divided into four partial areas but may be divided into at least three partial areas.

In the embodiment described above, the image processing is supposed to be carried out by the image processing section 7 which is built in the image capture device. However, such image processing may also be carried out by another device that is provided independently of that image capture device. For example, even if a signal that has been obtained by an image capture device including the image capturing section 100 of any of the embodiments described above is loaded into another device (image processor) to get a program defining the signal arithmetic processing described above executed by a computer in that another device, the effects of the embodiments described above can also be achieved. If the image processing is supposed to be carried out by an external image processor, the image capture device does not have to include the image processing section.

INDUSTRIAL APPLICABILITY

An image capture device according to embodiments of the present invention can be used effectively in every camera that ever uses an image sensor, and may be used in digital cameras, digital camcorders and other consumer electronic cameras and in industrial surveillance cameras, to name just a few.

REFERENCE SIGNS LIST 1 light-transmitting plate
1a, 1b, 1a-1, 1a-2 infrared reflecting mirror
1c half mirror
1u light beam splitting area
1u-1, 1u-2, 1u-3, 1u-4 partial area
2 solid-state image sensor
3 lens
4 infrared cut filter
4a filter driving section
5 signal generating and receiving section
6 sensor driving section
7 image processing section
7a image generating section
7b depth information generating section
8 interface section
10 photosensitive cell
30 memory
100 image capturing section
200 signal processing section

The invention claimed is:

1. A depth estimating image capture device comprising:
an image sensor having a plurality of photosensitive cells arranged on its image capturing plane;
an optical lens that is arranged to condense light on the image capturing plane;
a light-transmitting member that is arranged on the image capturing plane and that includes a first mirror inside to reflect the light at least partially and a second mirror with the same reflection property as the first mirror on an upper surface of the light-transmitting member; and
a signal processor that processes photoelectrically converted signals supplied from the plurality of photosensitive cells,
wherein the first mirror has a reflective surface that is tilted with respect to the upper surface of the light-transmitting member,
wherein the second mirror has a reflective surface that is parallel to the upper surface,
wherein the first and second mirrors are arranged so that a light beam that has been come from a point on a subject through the optical lens is reflected from the first mirror, further reflected from the second mirror and irradiates some area on the image capturing plane to make the irradiated area change according to the depth of the point on the subject,
wherein the second mirror includes an opening, at least a portion of the first mirror is located directly below the opening of the second mirror, and the first mirror includes an opening directly below the opening of the second mirror, and
wherein the first and second mirrors have a property to reflect light falling within a particular wavelength range and transmit visible radiation falling out of the particular wavelength range,
the depth estimating image capture device further comprising:
an optical filter that cuts light falling within the particular wavelength range; and
a filter driver that introduces and removes the optical filter into/from an optical path leading from the subject to the image sensor, and
a controller that controls the filter driver and the image sensor to perform image capturing sessions twice in a row in a first state in which the optical filter is introduced into the optical path and in a second state in which the optical filter is removed from the optical path,
wherein the signal processor generates an image based on the photoelectrically converted signals supplied in the first state from the plurality of photosensitive cells and generates information indicating the depth of that point on the subject by sensing, through processing including calculating the difference between the photoelectrically converted signals supplied in the first state from the plurality of photosensitive cells and the photoelectrically converted signals supplied in the second state from the plurality of photosensitive cells, what area on the image capturing plane is irradiated with the light falling within the particular wavelength range.

2. The depth estimating image capture device of claim 1, wherein the signal processor generates information indicating the depth of that point on the subject by sensing, based on the photoelectrically converted signals supplied from the plurality of photosensitive cells, what area is irradiated with the light beam.

3. The depth estimating image capture device of claim 2, wherein the signal processor generates the information indicating the depth by reference to pieces of information that have been collected in advance to define a correspondence between the size of the area irradiated with the light beam and the depth of that point on the subject.

4. The depth estimating image capture device of claim 1, wherein when projected onto a plane that is parallel to the upper surface of the light-transmitting member, the first mirror casts either a ringlike shadow or a circular shadow.

5. The depth estimating image capture device of claim 1, wherein when projected onto a plane that is parallel to the upper surface of the light-transmitting member, the second mirror casts a shadow that surrounds the first mirror's shadow.

6. The depth estimating image capture device of claim 1, wherein the light-transmitting member has a first group of mirrors that is comprised of a plurality of mirrors that include the first mirror and that have the same reflection property, the same shape and the same tilt angle with respect to the upper surface, and
wherein each said mirror of the first group is arranged so that a light beam reflected from that mirror is further reflected from the second mirror and then irradiates one of multiple different areas on the image capturing plane.

7. The depth estimating image capture device of claim 6, wherein when projected onto the plane that is parallel to the upper surface of the light-transmitting member, the second mirror casts a shadow that surrounds each said mirror of the first group.

8. The depth estimating image capture device of claim 1, wherein at least one of the first and second mirrors has a light transmitting property.

9. The depth estimating image capture device of claim 1, wherein the light falling within the particular wavelength range is infrared light.

10. The depth estimating image capture device of claim 1, wherein the lower limit of the particular wavelength range is longer than 650 nm.

11. A depth estimating image capture device comprising:
an image sensor having a plurality of photosensitive cells arranged on its image capturing plane;
an optical lens that is arranged to condense light on the image capturing plane;
a light-transmitting member that is arranged on the image capturing plane and that has a light beam splitting area configured to divide a light beam falling within a particular wavelength range and having come from a portion of a subject through the optical lens, into at least three light beams; and
a signal processor that processes photoelectrically converted signals supplied from the plurality of photosensitive cells,
wherein the light beam splitting area is made up of at least three partial areas including first, second and third partial areas, of which the respective upper surfaces are located on the same plane, a first mirror that reflects light falling within the particular wavelength range is arranged in the first partial area, a second mirror having the same reflection property as the first mirror is arranged in the second partial area, and a third mirror having the same reflection property as the first and second mirrors is arranged on the upper surface of each said partial area,
wherein the first and second mirrors have a reflective surface that is tilted with respect to the upper surface of the light beam splitting area,
wherein the third mirror has a reflective surface that is parallel to the upper surface, and
wherein the first, second and third mirrors are arranged so that:
the light beam falling within the particular wavelength range that has been incident on the first partial area from that portion of the subject through the optical lens is reflected at least partially from the first mirror, further reflected from the third mirror, and irradiates a first group of photosensitive cells included in the plurality of photosensitive cells, and
the light beam falling within the particular wavelength range that has been incident on the second partial area from that portion of the subject through the optical lens is reflected at least partially from the second mirror, further reflected from the third mirror, and irradiates a second group of photosensitive cells included in the plurality of photosensitive cells, and
the light beam falling within the particular wavelength range that has been incident on the third partial area from that portion of the subject through the optical lens irradiates a third group of photosensitive cells included in the plurality of photosensitive cells,
whereby distributions of the quantities of light received to be sensed by the first, second and third groups of photosensitive cells are different from each other and vary according to the depth of that portion of the subject,
the depth estimating image capture device further comprising:
an optical filter that cuts light falling within the particular wavelength range;
a filter driver that introduces and removes the optical filter into/from an optical path leading from the subject to the image sensor; and
a controller that controls the filter driver and the image sensor to perform image capturing sessions twice in a row in a first state in which the optical filter is introduced into the optical path and in a second state in which the optical filter is removed from the optical path;
wherein the signal processor generates an image based on the photoelectrically converted signals supplied in the first state from the plurality of photosensitive cells and generates information indicating the depth of that point on the subject by sensing through processing including calculating the difference between the photoelectrically converted signals supplied in the first state from the plurality of photosensitive cells and the photoelectrically converted signals supplied in the second state from the plurality of photosensitive cells.

12. The depth estimating image capture device of claim 11, wherein the signal processor generates information indicating the depth of that portion of the subject based on the photoelectrically converted signals supplied from the first through third groups of photosensitive cells.

13. The depth estimating image capture device of claim 12, wherein the signal processor generates the information indicating the depth by reference to pieces of information that have been collected in advance to define a correspondence between either respective peak values or distributions of the quantities of light received to be sensed by the first through third groups of photosensitive cells and the depth of that portion of the subject.

14. The depth estimating image capture device of claim 11, wherein the light beam splitting area is made up of first, second, third and fourth partial areas, of which the shapes and sizes are equal to each other, and
wherein the third mirror is arranged in the same pattern on the upper surface of the third and fourth partial areas.

15. The depth estimating image capture device of claim 14, wherein when viewed perpendicularly to the upper surface of the light beam splitting area, the first through fourth partial areas are arranged in two rows and two columns.

16. The depth estimating image capture device of claim 15, wherein the first partial area is located at a row 1, column 2 position, and wherein the second partial area is located at a row 2, column 1 position, and wherein the third partial area is located at a row 1, column 1 position, and wherein the fourth partial area is located at a row 2, column 2 position.

17. The depth estimating image capture device of claim 11, wherein the third mirror has a circular or ringlike opening on the upper surface of each said partial area.

18. The depth estimating image capture device of claim 17, wherein the third mirror has a first ringlike opening on the upper surface of the first partial area, a second ringlike opening that is different in size from the first opening on the upper surface of the second partial area, and a circular opening on the upper surface of the third partial area.

19. The depth estimating image capture device of claim 18, wherein the first mirror is arranged to reflect the light beam that has come through the first opening toward a portion of the third mirror that is surrounded with the first opening, and
wherein the second mirror is arranged to reflect the light beam that has come through the second opening toward a portion of the third mirror that is surrounded with the second opening.

20. The depth estimating image capture device of claim 11, wherein the particular wavelength range is the wavelength range of infrared light.

21. The depth estimating image capture device of claim 11, wherein the lower limit of the particular wavelength range is longer than 650 nm.

22. The depth estimating image capture device of claim 11, wherein the first through third mirrors have a property to transmit visible radiation falling out of the particular wavelength range.

23. The depth estimating image capture device of claim 11, wherein the light-transmitting member has a plurality of light beam splitting areas which include the light beam splitting area and which each have the same structure.

24. The depth estimating image capture device of claim 1, wherein the first mirror both reflects and transmits the same wavelengths of light as the second mirror.

* * * * *